United States Patent [19]

Perreault

[11] 3,847,732

[45] Nov. 12, 1974

[54] SEMI-ENCODED FACSIMILE TRANSMISSION

[75] Inventor: Donald A. Perreault, Pittsford, N.Y.

[73] Assignee: Xerox Corporation, Rochester, N.Y.

[22] Filed: Sept. 15, 1972

[21] Appl. No.: 289,510

Related U.S. Application Data

[63] Continuation of Ser. No. 6,869, Jan. 29, 1970, abandoned.

[52] U.S. Cl. .................. 178/6, 178/DIG. 3, 178/68, 325/38 A

[51] Int. Cl. .............................................. H04n 7/12

[58] Field of Search ....... 178/DIG. 3, 68; 325/38 A, 325/141, 143; 328/129

[56] References Cited

UNITED STATES PATENTS

| | | | |
|---|---|---|---|
| 3,538,246 | 11/1970 | Macouski et al. | 178/DIG. 3 |

FOREIGN PATENTS OR APPLICATIONS

| | | | |
|---|---|---|---|
| 795,193 | 5/1958 | Great Britain | 178/DIG. 3 |
| 623,554 | 7/1961 | Canada | 178/DIG. 3 |

*Primary Examiner*—Robert L. Griffin
*Assistant Examiner*—Marc E. Bookbinder

[57] ABSTRACT

Method and apparatus for decreasing the transmission time of a facsimile signal over a bandlimited channel. The facsimile signal is converted to a two-level video signal which is encoded into pulses whose leading edges correspond in time to white-to-black transitions in the video signal and whose amplitude represents the duration of the video signal black run. In one embodiment the amplitude is a continuous analog of the duration. In a second embodiment, the amplitude is a quantized analog of the duration.

14 Claims, 27 Drawing Figures

INVENTOR.
DONALD A. PERREAULT
BY Irving Keschner
ATTORNEY

SEMI-ENCODED FACSIMILE TRANSMISSION

This is a continuation, of application Ser. No. 6,869, filed Jan. 29, 1970 now abandoned.

BACKGROUND OF THE INVENTION

A facsimile device, in general, is capable of transmitting or receiving video information over a transmission medium and utilizes scan or print transducers, or heads, to scan or reproduce graphic information. A facsimile transmitter optically scans graphic information on a document, converting information from optical to electrical form. The electrical video information is transmitted over a suitable transmission medium to the facsimile receiver. The electrical video signal is then applied to the receiving print head which reproduces the graphic information on a copy sheet.

Although a great deal of progress has been made in electronic picture transmission, such as in the facsimile transceiver described above, there still remains a need for a reduction in the electrical channel bandwidth required for transmitting such electrical signals, which can be utilized as a corresponding increase in the speed of transmission over fixed bandwidth facilities. Economy in the transmission of electrical signals on the one hand requires the use of a narrow bandwidth channel. Transmission systems are well known in which electrical signals are transmitted through a narrow band channel without sacrifice of definition or resolution by substantially increasing the picture transmission time. However, it is desirable to provide a communication facility having a relatively high transmission speed and a definition adequate for the intended purpose.

The prior art facsimile transmission systems have been characterized by generally large bandwidth-transmission time products. This means that facsimile signals can be transmitted over a bandlimited channel either with high definition and a correspondingly increased transmission time, or in a relatively short period of time in exchange for a high degree of signal degradation appearing primarily as a loss of resolution, but not both.

The bandwidth of the channel determines an upper limit on the speed of signaling through the channel. Frequency components of an analog signal, such as generated at the output of the transmitter scanner, which lie outside the bandwidth cannot be transmitted. Correspondingly, the highest rate at which discrete, i.e. binary signals can be transmitted synchronously is twice the bandwidth of the channel, in accordance with Nyquist's rule. The rate at which information can be transmitted is not limited by bandwidth alone, but by the combination of bandwidth and signal-to-noise ratio, i.e. the amplitude of the signal relative to the noise. The discrete signals can be made to represent more than one bit of information by allowing the signal to assume more than two states. Likewise, the amplitude continuum of an analog signal can carry information, as in voice and in the grey scale of picture transmissions. It is common practice in synchronous digital transmission to exceed the binary signaling rate of the channel by multi-level encoding. Pictorial information can also be digitally encoded but there are practical drawbacks. First, if the grey scale of information is to be preserved, additional bits are required to represent this information. Second, the encoding process generally requires synchronous data, implying synchronous sampling of the pictorial image. In order to avoid image degradation, the synchronous sampling must exceed the maximum element rate of the pictorial information. In practice, it has been found that the synchronous sampling rate must be at least 40 percent higher than the maximum element rate of the pictorial information. The resulting synchronous signaling rate therefore is about 40 percent higher than the non-synchronous picture element rate.

Facsimile transmission of business documents usually does not require the grey scale information. Even so, synchronous encoding of black and white images is not presently attractive because the additional depth of encoding, or the number of levels assigned for symbol transmission, required to offset the increased sampling rate unduly increases the sophistication of the required system.

SUMMARY OF THE INVENTION

The present invention provides method and apparatus for encoding of black and white facsimile images without synchronous sampling, thereby achieving increased speed of facsimile transmission in a more economical manner. Transmission beyond the speed limit established by the channel bandwidth is accomplished by eliminating half of the black/white transitions and encoding the location of the eliminated transitions into the amplitude of the signals which represent the remaining transitions.

It is an object of the present invention to provide method and apparatus for increasing the speed of facsimile transmission in a more economical manner.

It is a further object of the present invention to provide a facsimile system wherein signals can be transmitted over a bandlimited channel with high resolution and reduced transmission time.

It is still a further object of the present invention to provide method and apparatus for encoding black and white facsimile images without synchronous sampling, thereby achieving increased speed of facsimile transmission in a more economical manner. In particular, the facsimile signal is converted to a two-level video signal which is encoded into pulses whose leading edges correspond in time to white-to-black transitions in the video signal and whose amplitude represents the duration of the video signal black run. In one embodiment the amplitude is a continuous analog of the duration. In a second embodiment, the amplitude is a quantized analog of the duration.

DESCRIPTION OF THE DRAWINGS

For a better understanding of the invention as well as other objects and further features thereof, reference is made to the following description which is to be read in conjunction with the accompanying drawings wherein.

DESCRIPTION OF THE PREFERRED EMBODIMENTS

In a black and white facsimile image, the essential information is the location and direction of the black and white transitions. As the facsimile transmission speed is increased, the transitions occur closer together. Eventually the speed capability of the channel for the facsimile signal is exceeded. Transmission beyond this limit can be accomplished, however, by eliminating half of the black white transitions and encoding the deleted transition locations into the amplitude of the signals which represent the remaining transitions. The time of occurrence of the uncoded transitions is not affected by the encoding. The time of occurrence of the encoded transitions may or may not be affected by the encoding according to the particular coding rules adopted as will be described hereinafter. The basic concept of the present invention therefore has been named "semiencoding."

SEMI-ENCODING WITH TIME QUANTIZED TRAILING EDGES

Figure 1A:
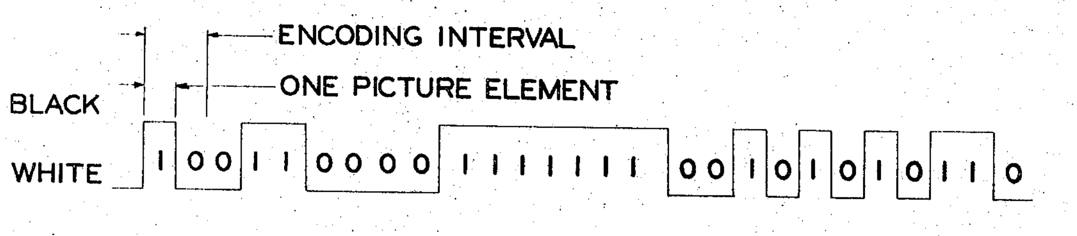
FIG. 1*a* is a two-level video waveform.
Figure 1B:
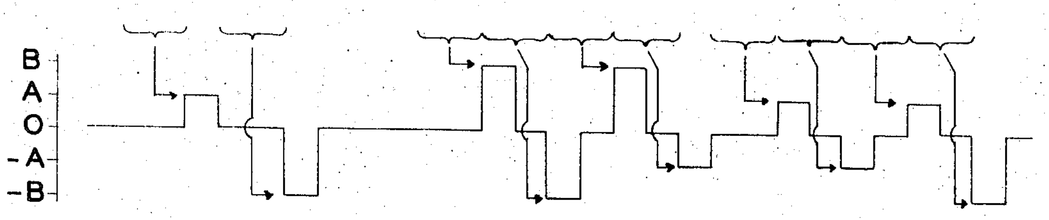
FIG. 1*b* is the waveform of FIG. 1*a* encoded in accordance with a first embodiment of the present invention.
Figure 2:
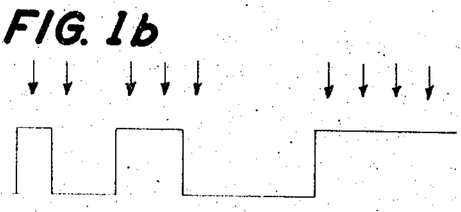
FIG. 2 illustrates a sampling interval which may be utilized in the present invention.

A pulse is transmitted for every positive (white-to-black) image transition and the polarity of the pulse is alternated for successive pulses. The pulse spacing is at least twice as great as the minimum image transition spacing since the negative image transitions are skipped. If the image has a negative transition within the next two picture element times (defined by the maximum resolution requirement) the positive-transition pulse is transmitted with magnitude A, if there is no negative image transition the pulse is transmitted with a magnitude B. Thus, starting from a white condition, a black element followed by a white element is identified as a pulse of magnitude A of a predetermined pulse width (of either polarity) and a black element followed by another black element is identified as a pulse of magnitude B of the same pulse width (of either polarity). If a black run continues beyond two elements, an artificial transition is introduced and another pulse is transmitted with a magnitude descriptive of the next two elements. FIG. 1*b* shows the encoding of the two level video waveform shown in FIG. 1*a*, which happens to be composed of integral picture elements. The ones and zeros represent the amplitude of the sliced facsimile signals. This would not usually be the case when the signal is created by scanning an ordinary document. Real signals may contain black images of any duration and white images of any duration. Processing of the real signal to accommodate all patterns may be accomplished by the encoding means as will be described hereinafter or by the encoding means in association with other circuitry. For example, in one method for operating on a real signal as shown in FIG. 2, the signal is sampled at intervals of one picture element starting one-half element after each white-to-black transition, the sampled output pulse terminating when the sample indicates white. The arrows in this Figure represent the sampling times and intervals. By this means all lone black images less than one-half element in duration are eliminated and all black images longer than one-half element are made to be an integral number of elements. If successive white-to-black transitions are closer than the nominal system resolution prescribes, the resulting encoded pulses will be subjected to intersymbol interference in transmission. Detection and decoding with degraded performance may be attempted, or alternatively the encoding logic may be designed to eliminate pulses which are closer than prescribed. In either case the system is considered to be overloaded.

In another method the video signal is processed by linear means, such as low pass filtering, to insure that black or white elements shorter than the minimum prescribed by the nominal system resolution do not occur. After this processing the signal is sampled as previously described except that the first sample after a white to black transition is redundant. All black images are made to be an integral number of elements long.

In still another method, the video signal is processed by non-linear means such as pulse stretchers to guarantee desirable signal dimensions. Desirability is to a large extent determined by subjective effects on resulting copy quality. The position of the sampling "strobe" also has an effect on the subjective quality of the copy. The strobe may be placed at a position other than the center of picture element intervals in order to achieve desired effects.

The relative time of occurrence of white-to-black transitions is not disturbed by the encoding, whereas the time of occurrence of the black-to-white transitions is quantized to an integral element position. In ordinary facsimile equipment, the scanning arrangement is such that the white-to-black transitions represent the leading edges of the image in the left-to-right reading sense. Quantizing of the trailing edge position has the advantage that the quantized integral element position, although subject to "quantizing noise," is immune to all transmission noise which does not exceed the detection threshold.

The transmitted pulses are alternated in polarity for two important reasons. First, alternation provides for detection of the time of occurrence of the pulses in the absence of a synchronous clocking system. Second, alternation reduces the power density spectrum at high and low frequencies and concentrates it around half the transmission pulse rate. This result is evident in FIG. 1*b* wherein it can be seen that the long black run becomes an alternating pulse train of peak amplitude B, and the following high resolution run becomes an alternating pulse train of the same frequency but with peak amplitude A. This result of concentrating the power away from the transmission band edges is very beneficial in reducing the incidence of distortion due to amplitude response roll-off and the associated envelope delay characteristic of real channels.

SEMI-ENCODING WITH CONTINUOUS ANALOG CODING OF TRAILING EDGES

Figure 3:
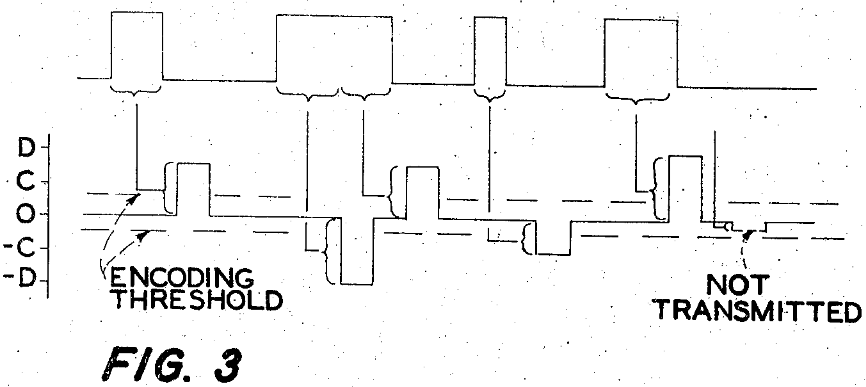
FIG. 3 illustrates the encoding of a two-level video waveform in accordance with another embodiment of the present invention.
Figure 4A:
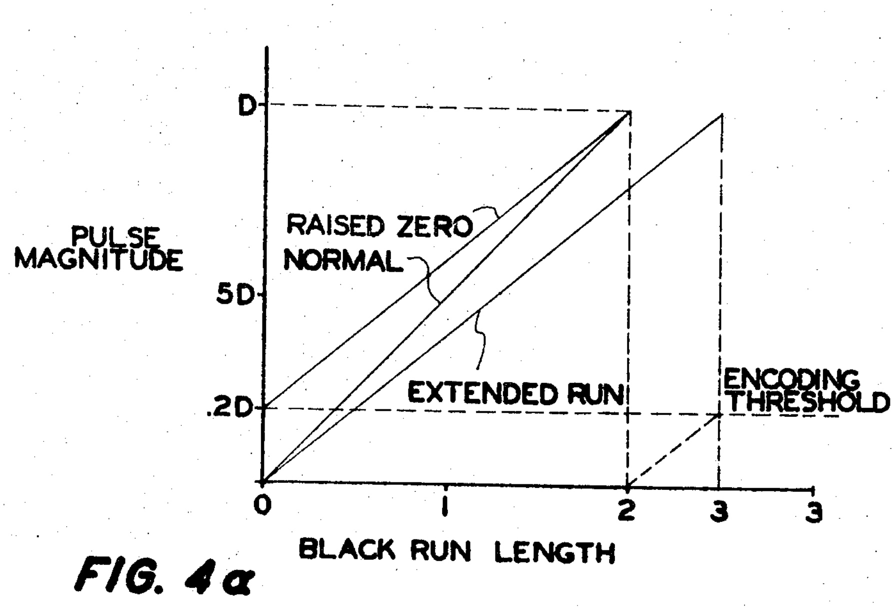
FIG. 4*a* – 4*c* illustrate a technique for encoding pulses whose duration are certain fractions of the picture elements being scanned.
Figures 4B, 4C:
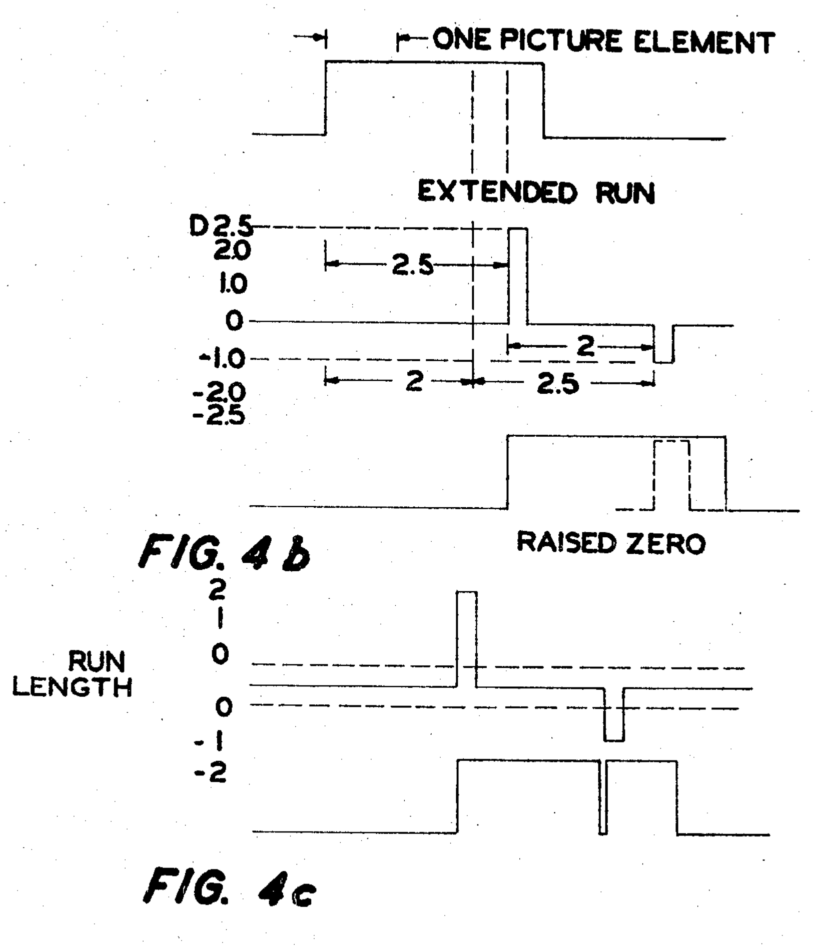

In another embodiment of the novel encoding technique of the present invention, the amplitude of the transmitted pulse is made a continuous analog of the black image duration as shown in FIG. 3. In the absence of transmission noise and mutual interference of pulses, the reproduced image at the receiver is an exact replica of the scanned image, i.e., there is no quantizing noise. However, there are some image patterns with non-integral runs, followed closely by another run, which can suffer unavoidable disturbance of the trailing edge when the transmission is bandlimited. In practice, means may be used to insure that lone black images shorter than one picture element are not presented to the encoder. Transmitted pulses representing the beginning of black runs therefore range in amplitude, for example, between magnitude C and magnitude D. However, transmitted pulses representing the end of black runs could range in magnitude from zero to magnitude D since the run can end in any fraction of two picture elements, assuming that the encoding interval is two picture elements. In order to prevent noise from being interpreted as short black images or short run-terminations, a detection threshold is established, for example, at one-fifth of the maximum pulse magnitude D. This threshold reintroduces some quantizing noise unless the encoder transfer function is changed appropriately. For example, if the pulse magnitude range from zero to D represents black runs of zero to two elements, then runs between 2 and 2.4 elements, 4 and 4.4 elements etc. cannot be accurately transmitted. (runs between 0 and 0.4 elements cannot occur if pulse stretching is used). This quantizing remnant can be eliminated either by "raising the zero" pulse, or black run, length to the threshold value or by "extending the run" to overlap the portion of the run below threshold. These alternatives are illustrated in FIG. 4*a*. In both cases pulses are transmitted two elements apart but in the "extended run" method the first pulse is not transmitted until 2.5 elements have been encoded as shown in FIG. 4*b*. Encoding of the next portion of the run commences after two elements, i.e., the encoding overlaps by one-half element and likewise the decoding overlaps by one-half element. FIGS. 4*b* and *c* show a run of 3 elements encoded and decoded by both methods. The methods are equivalent in terms of the ratio of run-length to pulse magnitude (slope of the encoding transfer function) which means that the intersymbol interference sensitivities are the same. However, the extended run method is preferred because the reconstructed video is less susceptible to transmission disturbance.

TRANSMISSION, DETECTION AND DECODING

The speed at which a semi-encoded system can operate depends on how closely the encoded pulses can be transmitted without intolerable mutual interference at the detector. This pulse spacing in turn is determined by the channel bandwidth and channel shape i.e., the baseband transfer function of the transmission means. Slow roll-off channels, or channels having a predetermined frequency characteristic, produce time responses with low overshoots. Roll-offs with odd symmetry about an upper frequency (Nyquist channels) produce oscillatory overshoots with regularly spaced zeros, which are essential for synchronous transmission, but which are not essential for the practice of the present invention.

Since the semi-encoded pulses are generated nonsynchronously, there is no regular spacing and the zeros of a Nyquist type response are not particularly valuable. Rather, it is consistent with the expected performance of the system to prescribe a shape which produces the worst interference with the minimum spacing and monotonically decreasing interferences as the spacing is increased. Also one of the main goals of the system is to simultaneously minimize the time and bandwidth ranges. It happens that the Gaussian pulse shape has both a monotonically decreasing time response and a monotonically decreasing frequency response given by $$H(W) = A_o e^{-\alpha \omega^2}$$

$$h(t) = A_o/2 \sqrt{\pi\alpha} e^{-t^2/4\alpha}$$

wherein:

H(W) = Gaussian pulse frequency response
h($t$) = Gaussian pulse time response
$A_o$ = Amplitude constant
$\alpha$ = Gaussian time constant
$\omega$ = angular frequency
$t$ = time Furthermore the Gaussian shape is the only one which minimizes the product of the root mean square (rms) durations in time, $D_t$, and frequency, $D_w$, i.e., $$D_t D_w = \left[\int_{-\infty}^{\infty} t^2|h(t)|^2 dt\right]^{1/2} \times \left[\int_{-\infty}^{\infty} w^2|H(w)|^2 dw\right]^{1/2}$$

Unfortunately, the Gaussian frequency response is not strictly bandlimited. Therefore, the Gaussian time response cannot be realized exactly within a bandlimited channel. However, the time response of a Gaussian channel truncated beyond the 20 db point is a useful approximation to the ideal response. The ideal Gaussian shape will be used to further illustrate the design considerations affecting speed and performance. It should be noted that other bandlimited channel shapes could be employed provided that the pulse spacing is prescribed so as to meet the desired interference requirements. Pulse responses with rapidly decaying overshots are of course preferred. It is assumed that the desired baseband channel shape is derived from available transmission facilities by means of appropriate filtering, equalization, and modulation/demodulation if necessary. The baseband channel shape, though designed to meet the requirements of a semi-encoded system, is not the essence of this invention.

Figure 5:
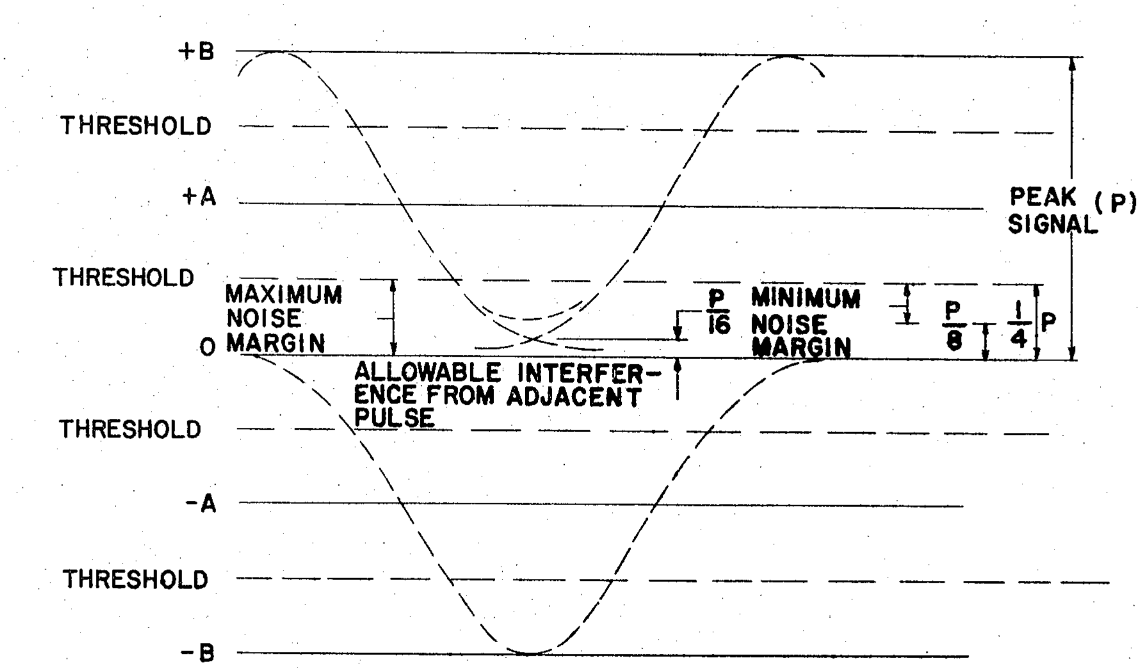
FIG. 5 shows the encoded waveform after transmission through a prescribed bandlimited channel.

After transmission through the prescribed bandlimited channel, the signal at the detector is of the nature shown in FIG. 5. In the case of quantized trailing edges, there are five discrete levels, $\pm A \pm B$ and 0 (for white runs) for example, and four evenly spaced thresholds to detect the levels. The error margin (distance between any signal level and adjacent thresholds) is one-eighth of the peak-to-peak signal or one-fourth of the peak signal P. This margin may be reduced by intersymbol interference, i.e. the tails of adjacent pulses overlapping the peak time of the pulse. A design limit may be placed on overlapping of the ideal pulses based on knowledge of the noise characteristics of transmission media and further intersymbol interferene produced by unwanted imperfections in the channel shape contributed by the transmission facilities. With a design limit of 6 db reduction in error margin, the pulse overlapping can be half the margin or one-eighth of the peak signal. Since the interference can be due to both a preceding and a following pulse, the tail of each individual pulse must be limited to one-sixteenth or 6.25 percent of the peak signal at the time of the adjacent pulse. The Gaussian pulse, equation (2) set forth hereinabove, is 5 percent when $t^2 = 12\alpha$ or $\alpha = (t^2/12)$ The corresponding Gaussian frequency response is down 20 db when $\alpha = 2.3/\omega^2$. If, for example, it is desired that pulses be transmitted with a spacing of T=500 microseconds then $\alpha = (500\times10^6)^2/12$ corresponding to a Gaussian channel with 20 db point at $f=1/2\pi\ \sqrt{2.3/\alpha}$ = 1670 hz which can be derived by the proper modem design from common voice frequency transmission facilities. The pulse spacing is twice the picture element duration. Therefore this example represents a picture element transmission rate of $1/(250 \times 10^{-6}$ sec) or 4,000 picture elements per second. In the case of continuous coding of trailing edges similar design constraints are derived. With regard to a threshold, the constraint considerations are the same. Above threshold the interference must be interpreted as variations of black image duration. For example, if the pulse peak represents 2 ½ picture elements, then an amplitude change of one-eighth represents a change of black image length of five-sixteenths picture element.

Figure 6:
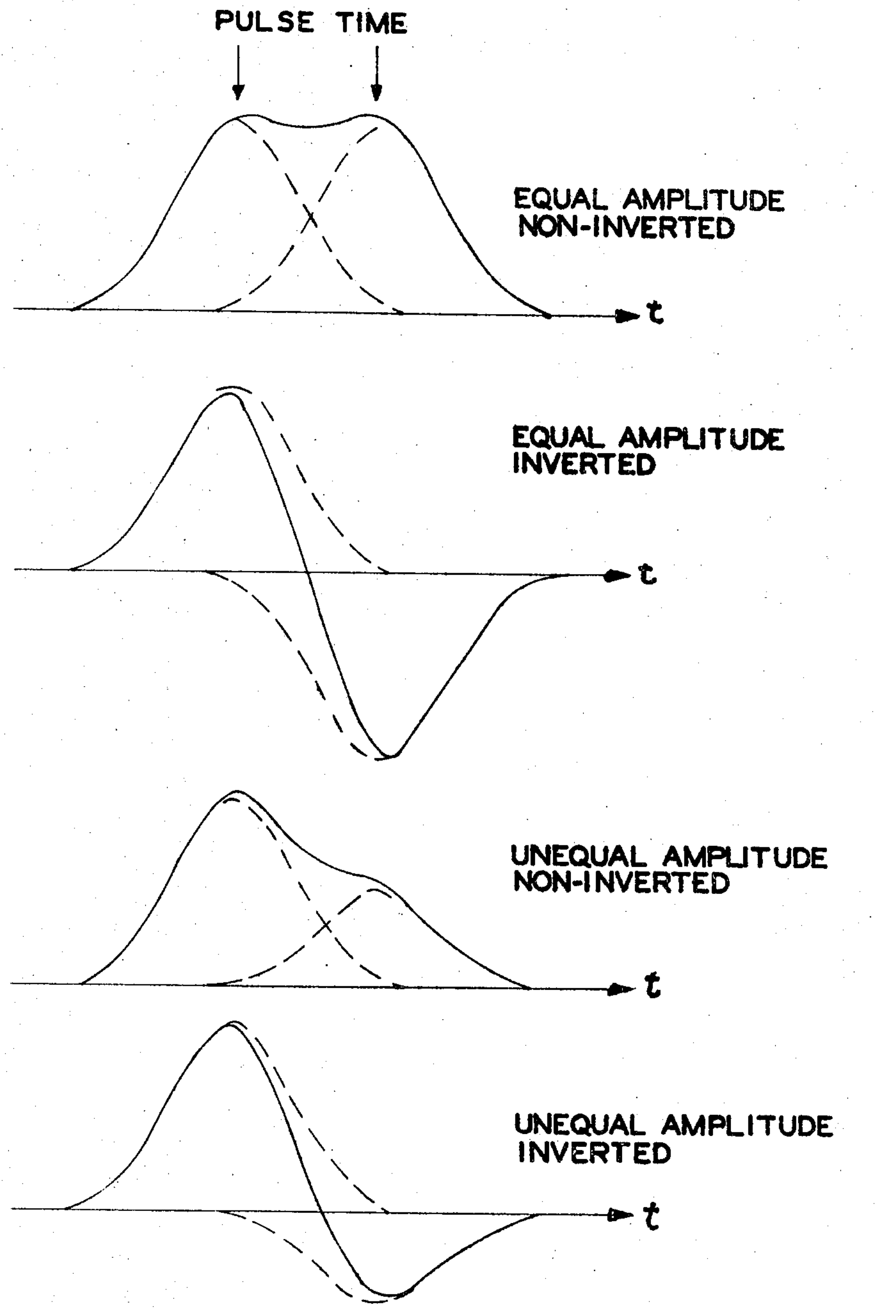
FIG. 6 illustrates the effect of interference of adjacent pulses on waveforms transmitted through the channel.

The two parameters of the encoded waveform which must be detected at the receiver are the time of occurrence of the pulses and the magnitude of the pulse at the peak. The train of pulses generated from the output of a scanner is essentially non-synchronous since the pulses (except those representing the continuation of black) correspond to the white-to-black transitions of an arbitrary image. There is no regular clock or timing inherent in the signal which could be recovered at the receiver, for example, by averaging the pulse transitions and then sampling the pulse train, as is done in digital data transmission. The time of occurrence of each pulse must be detected from the pulse itself. Since the peak is the only portion of the pulse with minimum (ideally zero) inter-symbol interference it is used to identify the pulse in time. This is accomplished for example, by a differentiator which transforms the zero slope at the peak into a zero crossing, from which a sampling pulse is created. In order to avoid the reduction, or even inversion, of the pulse peak caused by adjacent pulses of the same polarity, every other pulse is inverted before transmission (See FIG. 6). This alternating of polarity not only preserves the identity of the pulse peaks but also concentrates the power density spectrum of the encoded signal, as explained hereinabove. It should be noted that although alternating pulse polarity is the preferred embodiment, the present invention may be utilized without alternating the polarity of adjacent pulses. For example, at slower transmission speeds, the pulse spacing may be of a duration such that unaltered, adjacent pulses may be transmitted without undue mutual interference. In addition, sensitive detection apparatus may be used to recover transmitted, unalternated pulses at the receiver although adjacent pulses mutually interfere.

In addition to amplitude disturbance by adjacent pulses, there is also the possibility of some displacement of the time of occurrence of the pulse, i.e., the zero slope instance of the peak. This disturbance was analyzed and found to be of the same order of magnitude as transition disturbances which can be suffered in conventional facsimile transmission. With semi-encoding, it can be less or greater depending on the particular transmission parameters used.

The sampling pulse derived by differentiation is used to sample the magnitude of the received pulse peak and also to trigger the decoder to begin creating the black signal level. The duration of the black signal is controlled by the magnitude of the received pulse in the continuous analog coding method. In the "quantized" method, the duration is either one or two picture elements as determined by a set of thresholds which decide if the received pulse is nearest to magnitude A or magnitude B. The polarity of the pulse is not used by the decoder. In the continuous method, the duration is a direct analog of the magnitude, above a certain minimum set by a threshold. Spurious zero crossings in the differentiator output caused by noise and distortion do not cause an output from the decoder unless the magnitude thresholds are also exceeded. The incidence of spurious output from the decoder due to large amplitude noise could be reduced by a polarity monitor which discards the information derived from received pulses which violate the polarity inversion rule. The output of the decoder is a two level signal, one level representing white and the other black. The transitions from white-to-black are coincident with the peaks of the received pulses, i.e. the relative time of these transitions is the same as at the scanner except for transmission disturbances. The black-to-white transitions are located with respect to the white-to-black transitions according to the pulse amplitude, i.e., in either exact relative time or within a time quantum according to whether the encoding was continuous or quantized.

The decoder output is then applied to the associated printer.

Synchronizing and framing signals can be incorporated into the transmitted semi-encoded signal in the same manner as they are incorporated into conventional video signals i.e., during line and/or frame flyback times.

Figure 7:
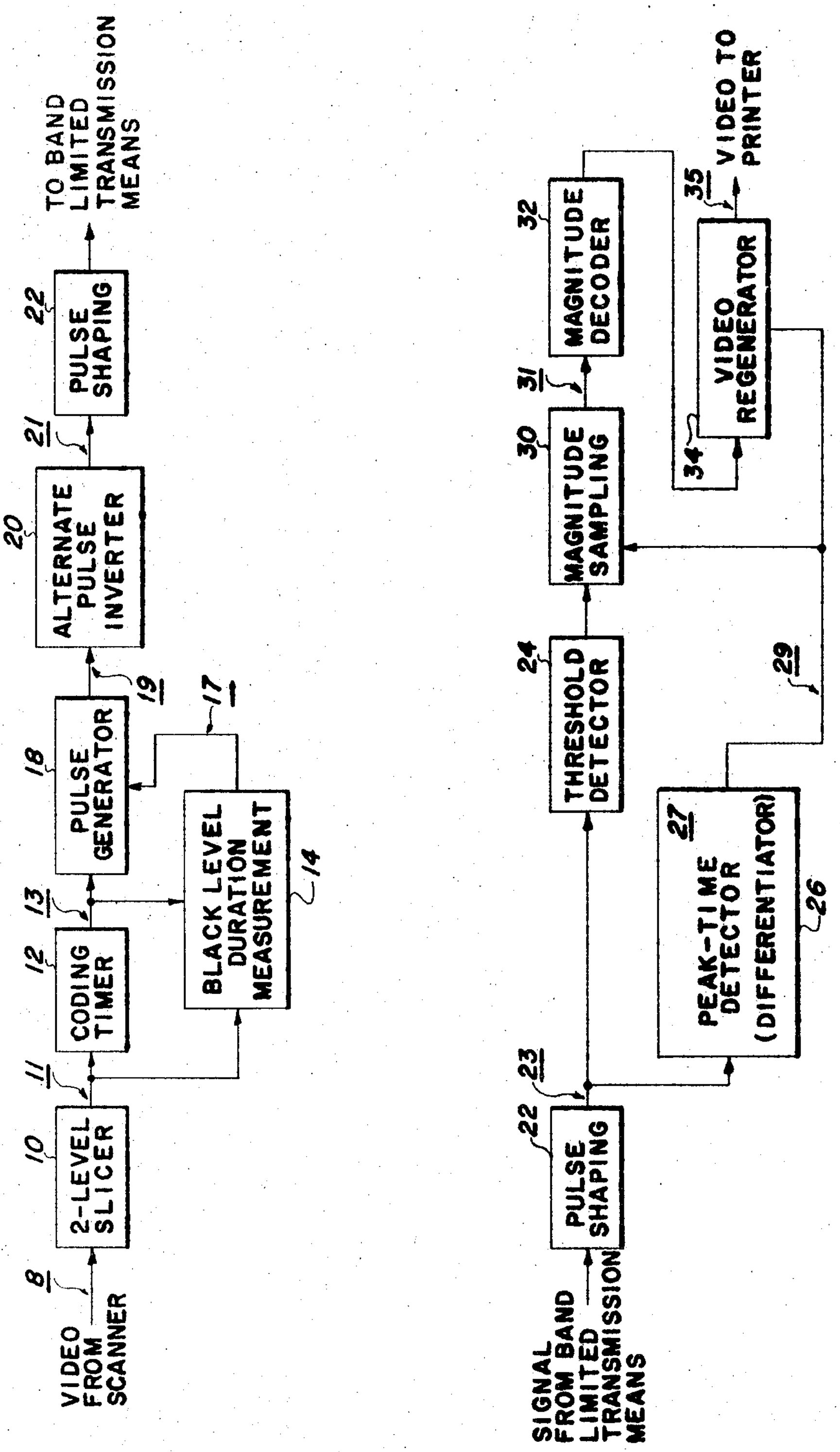
FIG. 7 is a block diagram of transmitter and receiver sections as utilized in the present invention.
Figure 8:
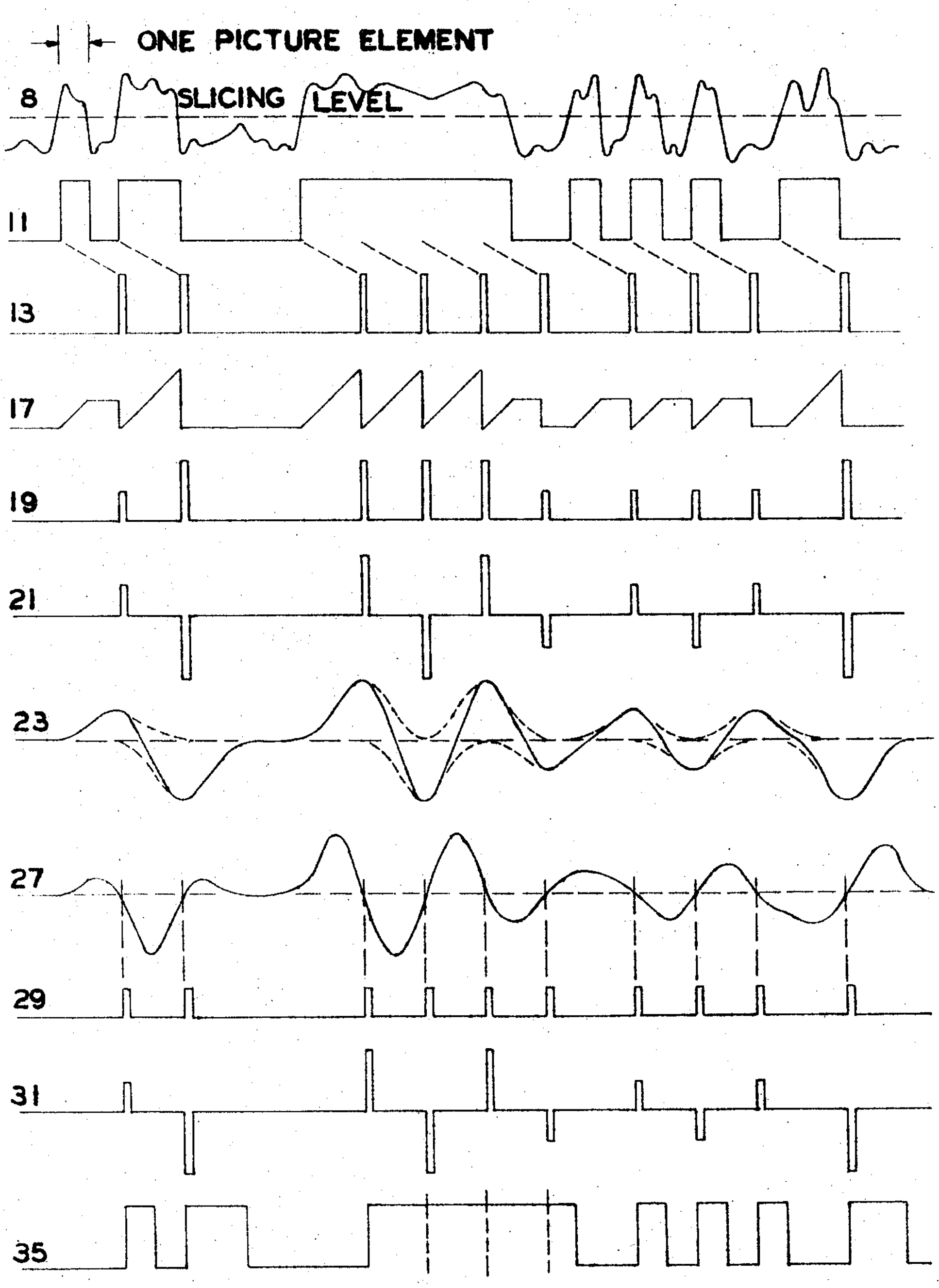
FIG. 8 illustrates the waveforms associated with the block diagram of FIG. 7.

Referring now to FIG. 7, a general block diagram of the transmitter and receiver sections as utilized in the present invention is shown. FIG. 8 shows the waveforms associated with the various portions of the block diagram of FIG. 7, and should be read in conjunction therewith. The video signal 8, generated by a conventional scanning system utilized in facsimile systems is fed to two-level slicer 10. The slicers are of conventional design and operate to produce a two-level pulse output 11. The output from slicer 10 is connected to coding timer 12 and black level duration measurement device 14. The output waveform 13 of the coding timer 12 comprises positive pulses of constant magnitude and uniform width, the pulse being generated each time a white-to-black transition occurs, and when the black run duration is greater than two picture elements as described hereinabove. The output of coding timer 12 is coupled to black level duration measurement device 14 via lead 16. Device 14 integrates pulse output 11 and is reset to zero by the leading edges of the pulses comprising waveform 13. The output 17 from device 14 and output 13 from coding timer 12 are connected to pulse generator 18. The output 19 from pulse generator 18 corresponds to a pulse train having pulses whose time occurrence corresponds to the time of the white-to-black transitions and whose amplitude corresponds to the length of the black level duration. Output 19 is fed to alternate pulse inverter 20 which inverts alternate pulses, producing output 21 which is the semi-encoded facsimile signal of the present invention. The output of the alternate pulse inverter 20 is then applied to pulse shaper 22, shown as split between the transmitter and receiver according to good practice for transmitting via a noisy medium. Such a split is not necessary to proper functioning of the coding scheme. The pulse shaping could be done entirely at the transmitter or the receiver. The output of the pulse shaping means 22 at the transmitter end is coupled to a band limited transmission means such as a wire, cable, or modem (modulator and demodulator) operating in conjunction with bandpass transmission facilities, such as in facsimile transmission, multiplex carrier or radio, etc. The output from the band limited transmission means is shaped by pulse shaping means 22 at the receiver end and the output 23 thereof is connected to threshold detectors 24 and peak-time detector 26. The output 29 of peak-time detector comprises pulses of uniform magnitude and duration at the maximum amplitude of the pulses comprising output 23. The threshold detector 24 and the magnitude sampling device 30 operate on waveforms 23 and 29 to produce waveform 31 comprising pulses of varying amplitude, and of alternating polarity, the amplitude dependent on the amplitude of waveform 23 at a time determined by the pulses in waveform 29. The output of magnitude sampling device 30 is coupled to video regenerator 34 via magnitude decoder 32. The output 35 of video regenerator 34 comprises pulses whose duration is dependent on the amplitude of the pulses comprising waveform 31. Output 35 of video regenerator 34 is fed to the facsimile printer whereat the original facsimile image is reconstructed. The particular details of the various elements described hereinabove which comprise the present invention will be described with reference to FIGS. 10 – 22 hereinbelow. It should be noted that apparatus for monitoring the polarity of waveform 31 and inhibiting video regenerator 34 if the monitored waveform does not alternate in polarity may be included at the receiver.

Figure 9:
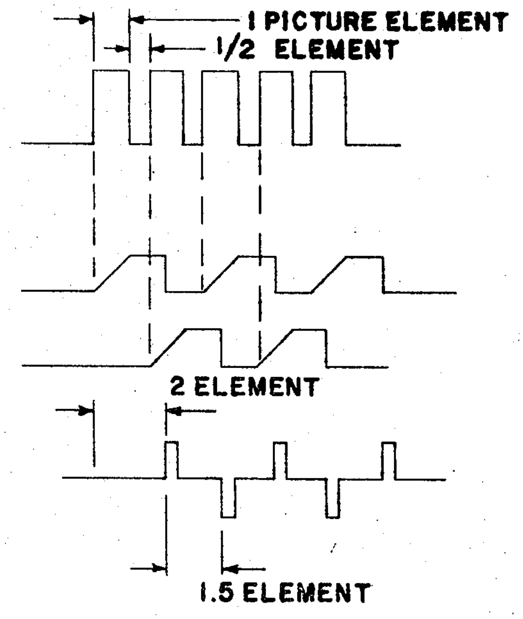
FIG. 9 illustrates the encoding of a series of black runs to produce graceful degradation in accordance with the teachings of the invention.

In many practical facsimile systems, the scanner resolution capability exceeds the bandwidth of the associated transmission means even when encoding is performed. Under these circumstances the sliced video presented to the encoder can contain black runs and/or white runs shorter than indicated by the nominal resolution of the overall system. Successive leading edges can thus occur closer together than the minimum pulse spacing prescribed for semi-encoded transmission. These occurrences can be eliminated prior to semi-encoding by linear means such as low pass filtering or non-linear means such as pulse stretchers and/or narrow pulse eliminators. However, it is often subjectively preferable to print something, ven though compromised in quality, rather than nothing. The encoding scheme can be made to function beyond the nominal resolution limits with a corresponding increase in mutual interference. This requires that the measurement of black runs overlap in time, i.e., a dual encoding system with coordinated controls is required. The waveforms of FIG. 9 illustrate the encoding of a series of one element black runs separated by halfelement white runs into pulses transmitted 1 ½ elements apart rather than the nominal two elements. The overlapping of the two element pulse width measurement intervals is evident. This technique provides "graceful degradation" of image quality as the image resolution exceeds the nominal limit of the system.

IMPLEMENTATION OF QUANTIZED CODING SYSTEM

Figure 10:
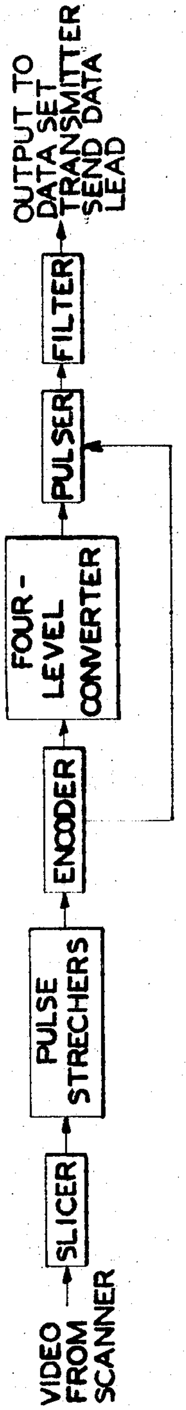
FIG. 10 is a block diagram of the transmit portion of the quantized coding system.

FIG. 10 is a block diagram of the transmit portion of the quantized encoding embodiment of the present invention. All the elements in the block diagram are conventional elements utilized in the transmission of digital data, except the encoder, which will be described with reference to FIG. 11. In order to clearly describe the operation of the invention, the circuit diagrams for the four-level converter and pulser are set forth in FIGS. 13 and 14, respectively.

The filter provides approximate Gaussian pulse shaping. Its bandwidth is tailored to fit the baseband provided by the particular data set used for transmission. The slicer quantizes the raw video into two levels. The pulse stretchers are set to guarantee that any black level corresponds to one picture element at the nominal resolution and that any white level corresponds to one-half picture element. For illustrative purposes, the black level may be set for at least 266 microseconds long (corresponding to a nominal minimum pulse spacing of approximately 532 microseconds) and that any white level is therefore chosen to be at least 133 microseconds long.

Figure 11:
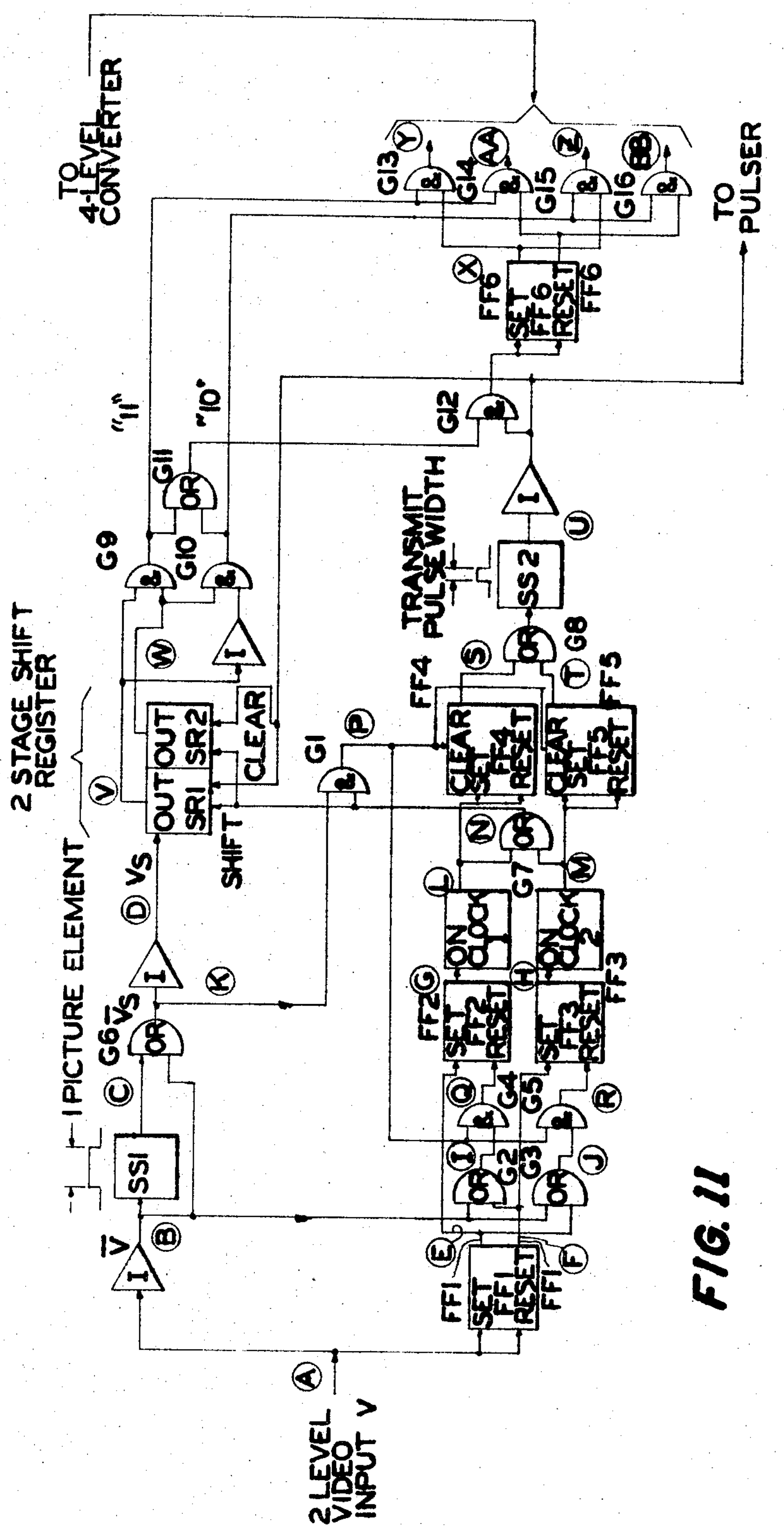
FIG. 11 is the logic diagram of the transmitter encoding circuitry utilized in the block diagram of FIG. 10.
Figure 12A:
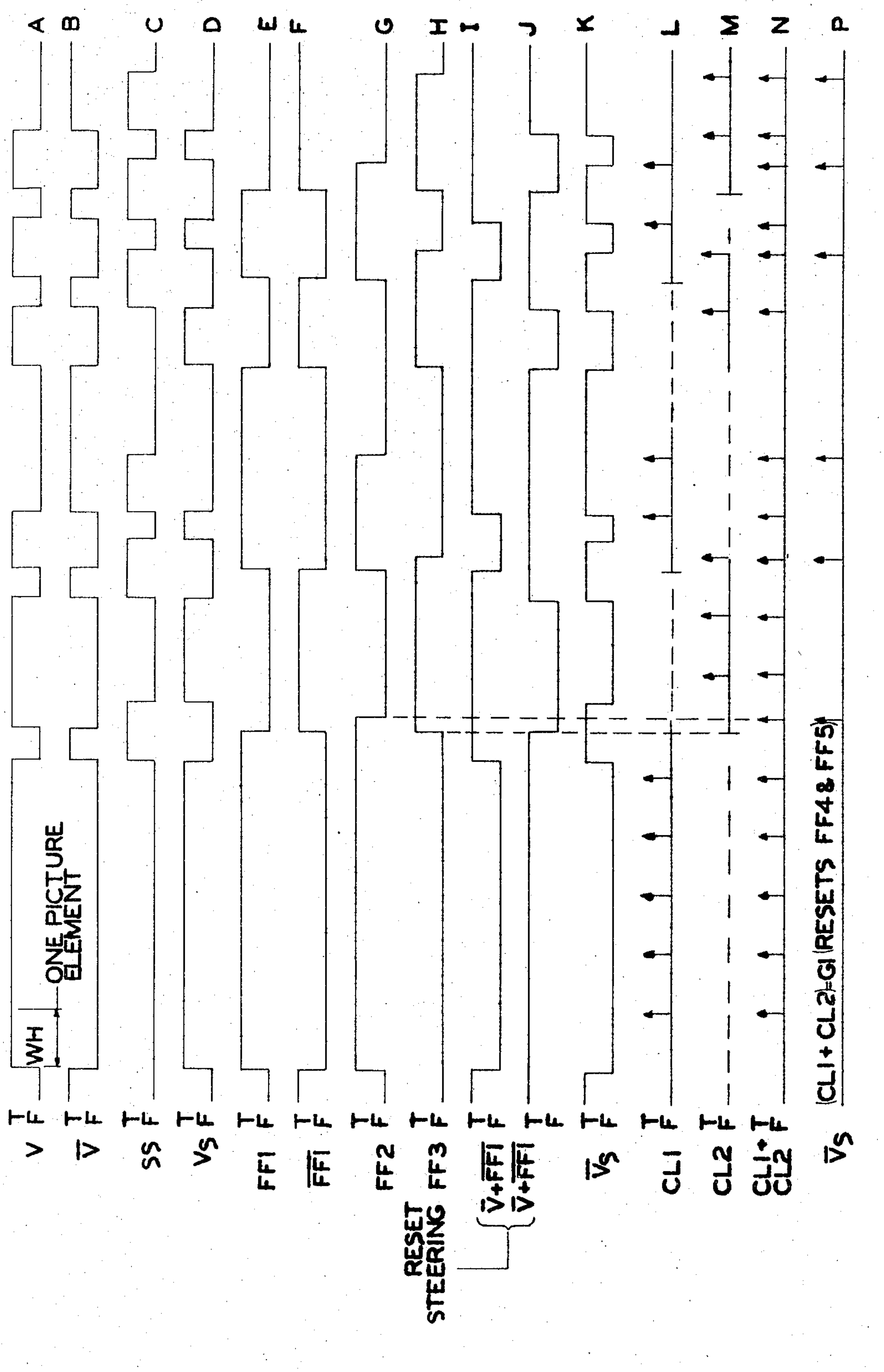
FIGS. 12*a* and 12*b* are waveforms associated with the block diagram of FIG. 10 and the logic circuitry of FIG. 11.
Figure 12B:
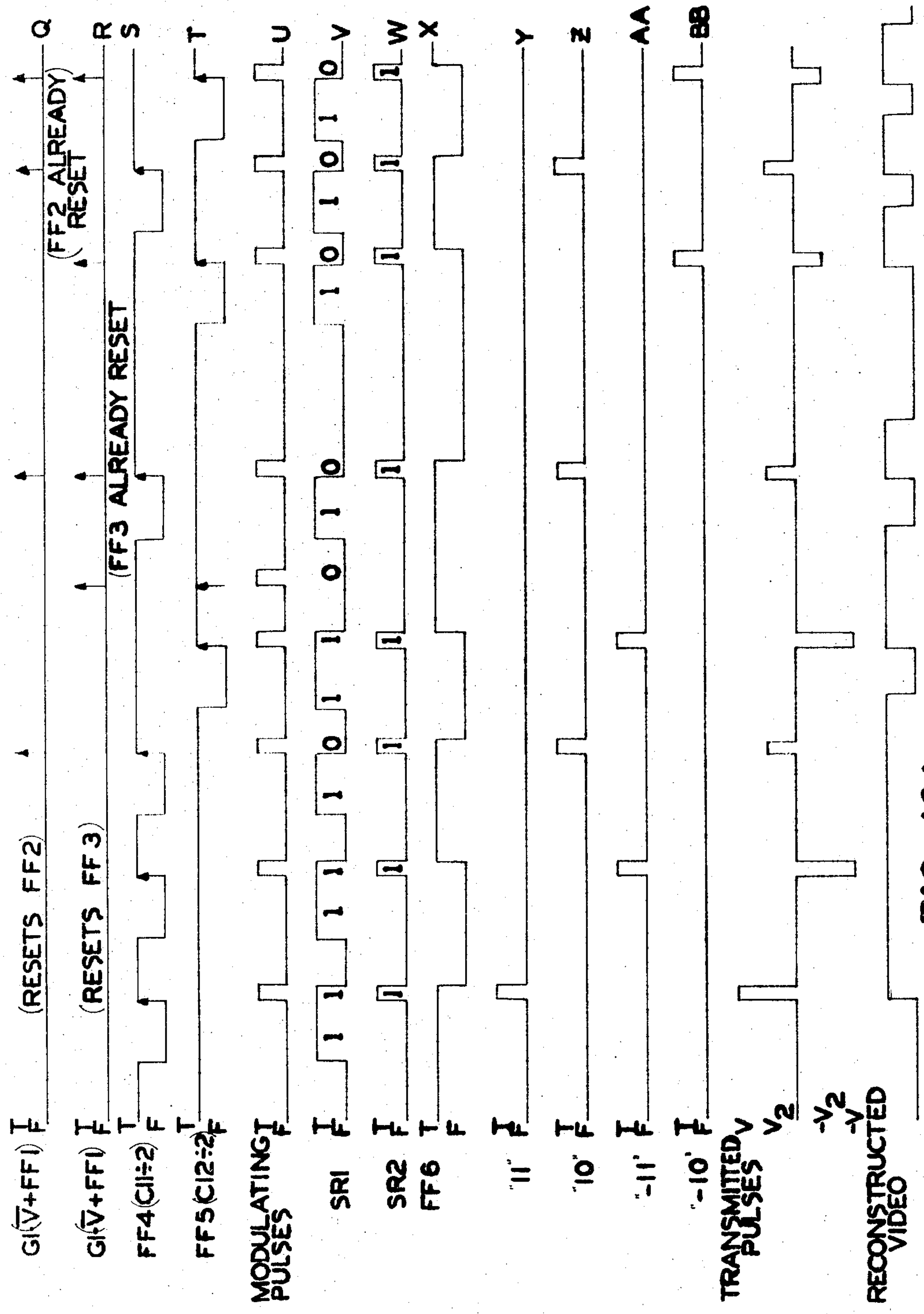

Referring now to FIGS. 11 and 12*a* and 12*b*, a generalized logic diagram of the encoder shown in FIG. 10 and the associated waveforms, respectively, is shown. For purposes of explanation it has been assumed that the "up" level represents logical "true" (T) and the "down" level represents logical "false" (F). The video black level is "true." The flip-flops are triggered by rising edges and the gates, of course, function on the "true" level according to their designations. The normal flip-flop output is designated "FF," the inverted output is designated "$\overline{FF}$." The inverters change the "true" level to "false" and vice-versa. The single shot functions are monostable circuits which create a "true" level at their outputs for a specified time after being triggered by a rising edge. The clocks are identical circuits which put out a stream of narrow "true" pulses at a constant rate when their "on" terminal goes "true." The pulses always start in a prescribed phase relationship to the "on" signal. The logic circuit described hereinbelow is only illustrative of the circuitry which may be utilized with the present invention. It is to be understood that "true" and "false" can be any convenient levels, and "true" need not be more positive than "false." In addition, the circuits may have different triggering characteristics and the actual implementation may therefore appear superficially different in the utilization of gates and inverters. The circuit operates as follows.

The white-to-black video transition toggles FF1. FF1 turns on Clock 1, or $\overline{FF1}$ turns on Clock 2, depending on the previous state of FF1. The selection alternates and the initial choice is immaterial. The video is modified by stretching the white areas so that the interval of the sampling strobe generated by the clock will not span a white run. This is done by triggering SS1 with inverted video, $\overline{V}$, logically "or-ing" the output with $\overline{V}$ in G6, and then inverting to form $V_s$. Prior to inversion $\overline{V}_s$ is also available. (This stretching is not to be confused with that of the pre-processing stretchers ahead of the encoder logic.) $V_s$ is sampled by shifting into a two stage shift register, SR1 and SR2, at the clock (element) rate. Either or both clocks supply the shift pulses via "or" gate G7. The clock frequency is equal to the nominal element rate. Therefore the shift register contents represent two elements of the video time quantized starting at the white-to-black transition. FIG. 12*a* shows the clock strobe occurring, as represented by the arrows, at the end of the picture elements for drawing convenience. The actual position of the strobe has some effect on the subjective quality of the reproduced image.

The clock frequency is divided by two in FF4 or FF5 (depending on which clock is active) and the rising edges of the "one-half clock" are used to generate modulating pulses at one-half the element rate. This is accomplished by "or-ing" the clock outputs in G8 to trigger SS2. The modulating pulse width is determined by SS2. The width is not significant. It is only required to be narrow enough, relative to the baseband bandwidth of the system, so as to approximate an impulse. (Wider pulses may be used if the baseband is appropriately compensated.) In the pulser, shown schematically in FIG. 14, the modulating pulses sample the state of the 4-level converter output and create transmitted pulses of 4 different amplitudes depending on the pattern in the shift register, and the polarity of the preceeding transmitted pulse. The pattern in the shift register is monitored by two AND gates G9 and G10. The first element of the pattern must always be a "1" since the sampling starts on a white-to-black transition. Therefore there are only two different valid patterns, 10 and 11. Four outputs are created from these two to represent alternation of polarity. This is accomplished by the four output AND gates, G13 thru G16, which are alternately enabled in pairs by FF6 and $\overline{FF6}$. FF6 is toggled by the trailing edge of the modulating pulses provided that the pattern in the shift register is either 10 or 11. This is done by "or-ing" the output of the shift-register pattern detector gates, G9 and G10, in G11 and then "and-ing" this signal with the modulating pulses, in G12, to form the trigger signal for FF6. Only one of the four output leads can be "true" at one time, depending on the pattern in the shift register and the state of FF6. If the pattern is 00 all the output leads are "false." The shift register is cleared with the trailing edge of the modulating pulse, i.e. the information is cleared immediately after it is transmitted.

Sampling, encoding, and transmission continue under control of the same clock until a strobe occurs during the "false" (white) state of $V_s$. This occurrence is detected by "and-ing" the shift pulses with $\overline{V}_s$ in G1. The output of G1 resets FF2 (or FF3), and also resets the dividers, FF4 and FF5. Gates G2 thru G5 provide steering for this reset control. The next white-to-black transition of V toggles FF1 and turns on the clock that was not turned on by the previous transition. Note that turning the clocks on according to V but off according to $V_s$ allows one clock to start before the other stops. In this manner the encoding periods can overlap by a prescribed amount and thus produce transmit pulses closer together than the nominal two element minimum spacing. This provides the graceful degradation feature described hereinabove. For example, the last three transmit pulses illustrated in FIG. 12*b* are 1 ½ elements apart and the fourth pulse is 1 ¾ elements from the preceeding pulse. When both FF2 and FF3 are "on" the state of FF1 can be used to steer the reset. When they are not both "on" this is not true. However, the fact that they are not both on indicates that a white run of equal to, or greater than, one whole element has occurred. Therefore, $\overline{V}$ can be used to steer the reset to both FF2 and FF3. (Resetting the one which is already reset causes no difficulty). This is done by "or-ing" $\overline{V}$ with FF1 and $\overline{FF1}$ in gates G2 and G3, respectively, and then "and-ing" these outputs with the reset pulse in gates G4 and G5.

Under certain conditions this particular logic allows modulating pulses to be generated closer than even the limit prescribed for graceful degradation. However, these occur when the encoder is registering a 00 pattern and all output leads to the 4-level converter are false. Under these conditions a zero amplitude pulse is generated, i.e. a pulse is not actually transmitted. The fifth modulating pulse in FIG. 12*b*, is an example of this "don't care" state of the logic.

Figure 13:
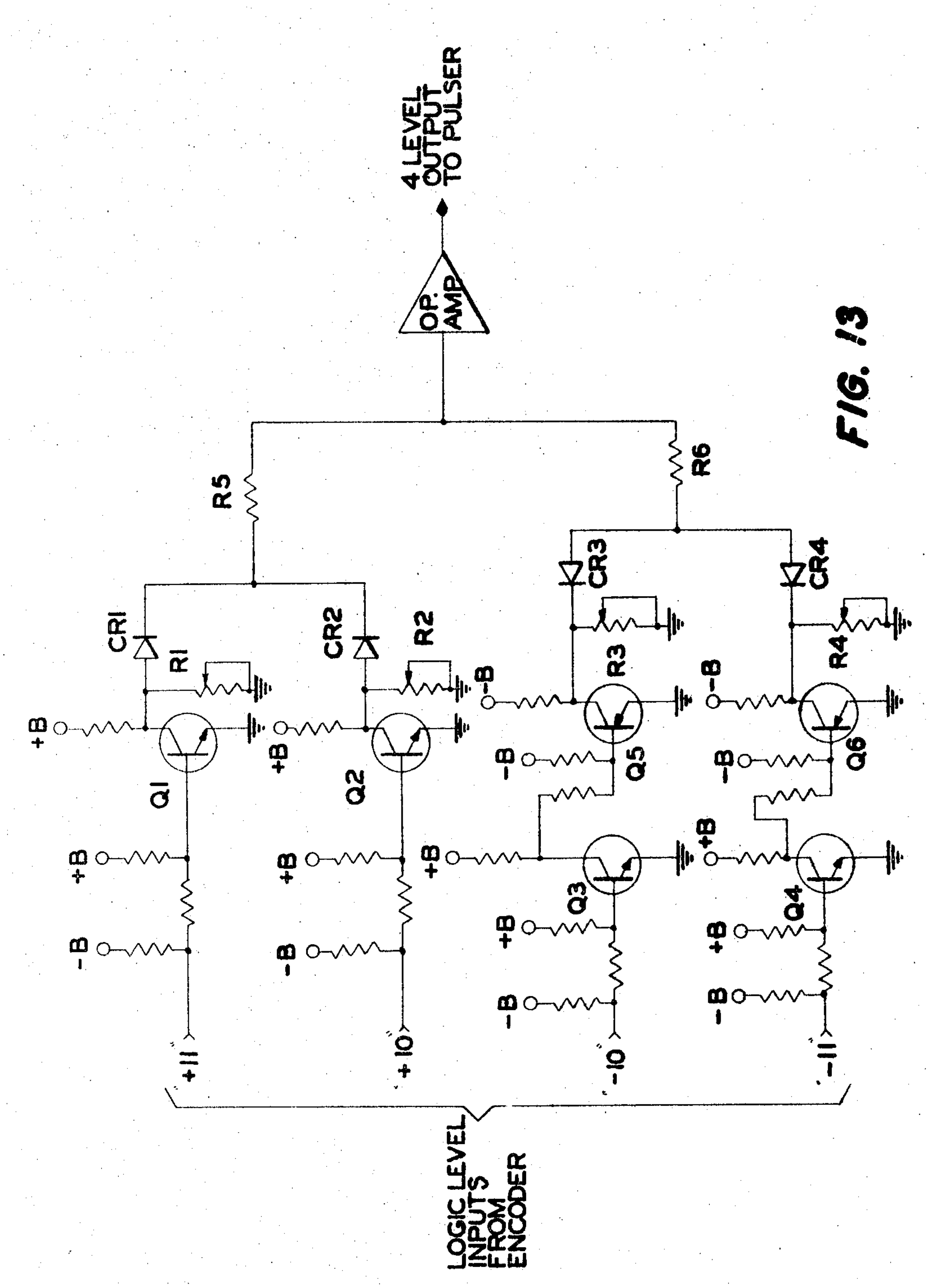
FIG. 13 is a schematic diagram of the four-level converter utilized in the block diagram of FIG. 10.
Figure 14:
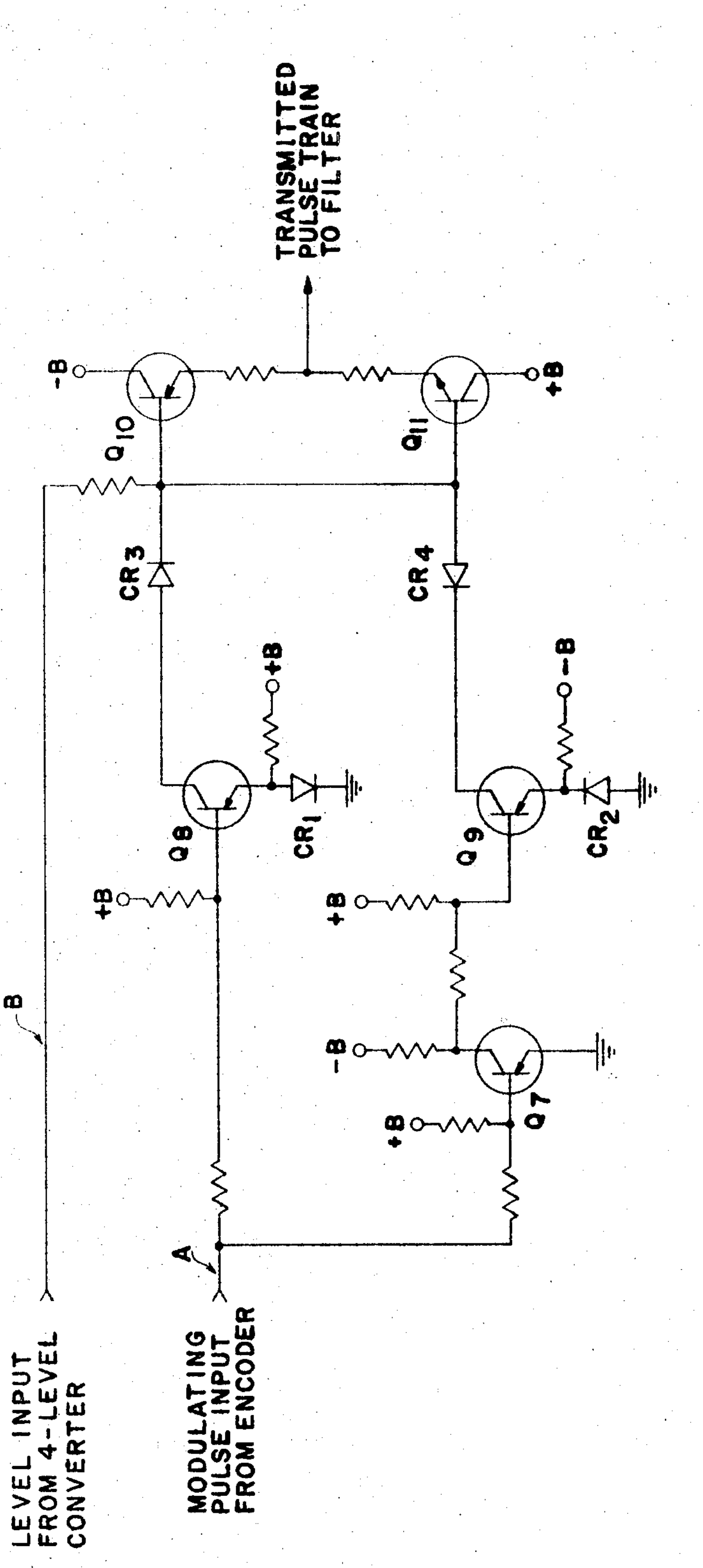
FIG. 14 is a schematic diagram of the pulser utilized in the block diagram of FIG. 10.

The 4-level converter shown in FIG. 13 produces one of four possible amplitudes according to which one of the four output leads of the encoder is positive. In the description that follows, it will be assumed that the encoder "true" logic level is −3 volts and the "false" logic level is 0 volts. Each of the input transistors, Q1 thru Q4, is biased so that when the logic input is 0 volts (false), the transistors are conducting in saturation. The collectors are therefore all essentially at ground potential. When the collector of transistors $Q_1$ and $Q_2$ is at ground, the input to the operational amplifier is zero. The ground at the collector of $Q_3$ biases $Q_5$ so that it is saturated and likewise $Q_4$ biases $Q_6$ so that it is saturated. The collectors of $Q_5$ and $Q_6$ are therefore also essentially at ground. Under these conditions, the input of the operational amplifier is zero and the output to the pulser is zero. When the "+11" input goes to −3V ("true") and all other inputs remain false, then $Q_1$ is cut off and its collector goes to a positive voltage determined by the setting of potentiometer $R_1$. This positive voltage is coupled to the operational amplifier input through diode CR1 and resistor R5, and the output is a corresponding positive voltage. Likewise when the "+10" input goes to −3V, $Q_2$ is cut off and the positive collector voltage determined by the setting of R2 is coupled to the operational amplifier input through diode CR2 and resistor R5, and the output is a corresponding positive voltage. When the "−10" input goes to −3V, $Q_3$ is cut off, its collector voltage rises cutting of $Q_5$ and the collector of $Q_5$ goes to a negative voltage determined by the setting of R3. This negative voltage is coupled to the input of the operational amplifier thru diode CR3 and R6, and the output is a corresponding negative voltage. Likewise when the "−11" input goes to −3V, $Q_4$ is cut off, $Q_6$ is cut off and the operational amplifier output is a negative voltage determined by the setting of R4. The potentiometers, $R_1$ thru $R_4$ are set to produce output levels of, for example, +V, +V/2, −V/2, and −V respectively.

The output of the 4-level converter modulates the amplitude of the "modulating pulses" created by the encoder. This takes place in the pulser shown in FIG. 14. This circuit is designed to create an output pulse when the modulating pulse from the encoder, appearing on lead A, is OV, and to put out OV when the encoder modulating pulse is −3V. Transistors $Q_7$ and $Q_8$ are biased into saturation when the pulse input is −3V. $Q_7$ biases $Q_9$ into saturation. $Q_8$ clamps the bases of $Q_{10}$ and $Q_{11}$ to ground against any negative voltage applied to lead B from the 4-level converter. $Q_9$ clamps the bases of $Q_{10}$ and $Q_{11}$ to ground against any positive voltage applied at lead B. Under these conditions $Q_{10}$ and $Q_{11}$ are not conducting and the output is zero. Diodes CR1 and CR2 maintain the emitters of $Q_8$ and $Q_9$ slightly above and slightly below ground, respectively, to compensate for the slight voltage drop in $Q_8$ and CR3, and in $Q_9$ and CR4. When an input pulse is present, i.e. OV on lead A, $Q_7$ and $Q_8$ are biased into cutoff. The collector of $Q_7$ goes negative and cuts off $Q_9$. Under these conditions, the bases of $Q_{10}$ and $Q_{11}$ are unclamped. A positive voltage on lead B will cause emitter follower $Q_{11}$ to conduct and develop a positive voltage across a load connected between pulse output and ground. Likewise a negative voltage on lead B will cause emitter follower $Q_{10}$ to conduct and develop a negative voltage across the load. If the input voltage is zero, the output remains zero.

Thus it can be seen that the modulating pulses, created by the encoder, and the voltages representative of the image pattern registered by the encoder (alternating in polarity), together form an alternating polarity pulse train whose pulse positions represent the beginning of a black image and whose magnitudes represent the duration of the black image.

The output of the pulser is applied to the filter which produces a bandlimited version of the pulse train suitable for transmission via an associated data set and transmission line. For example the signal levels at the interface may be 0, +1.75, +3.5 +5.25 and +7 corresponding to pulse amplitudes −B, −A, 0 +A, +B, i.e. encoded patterns −11, −10, 00, +01, +11 respectively.

Figure 15:
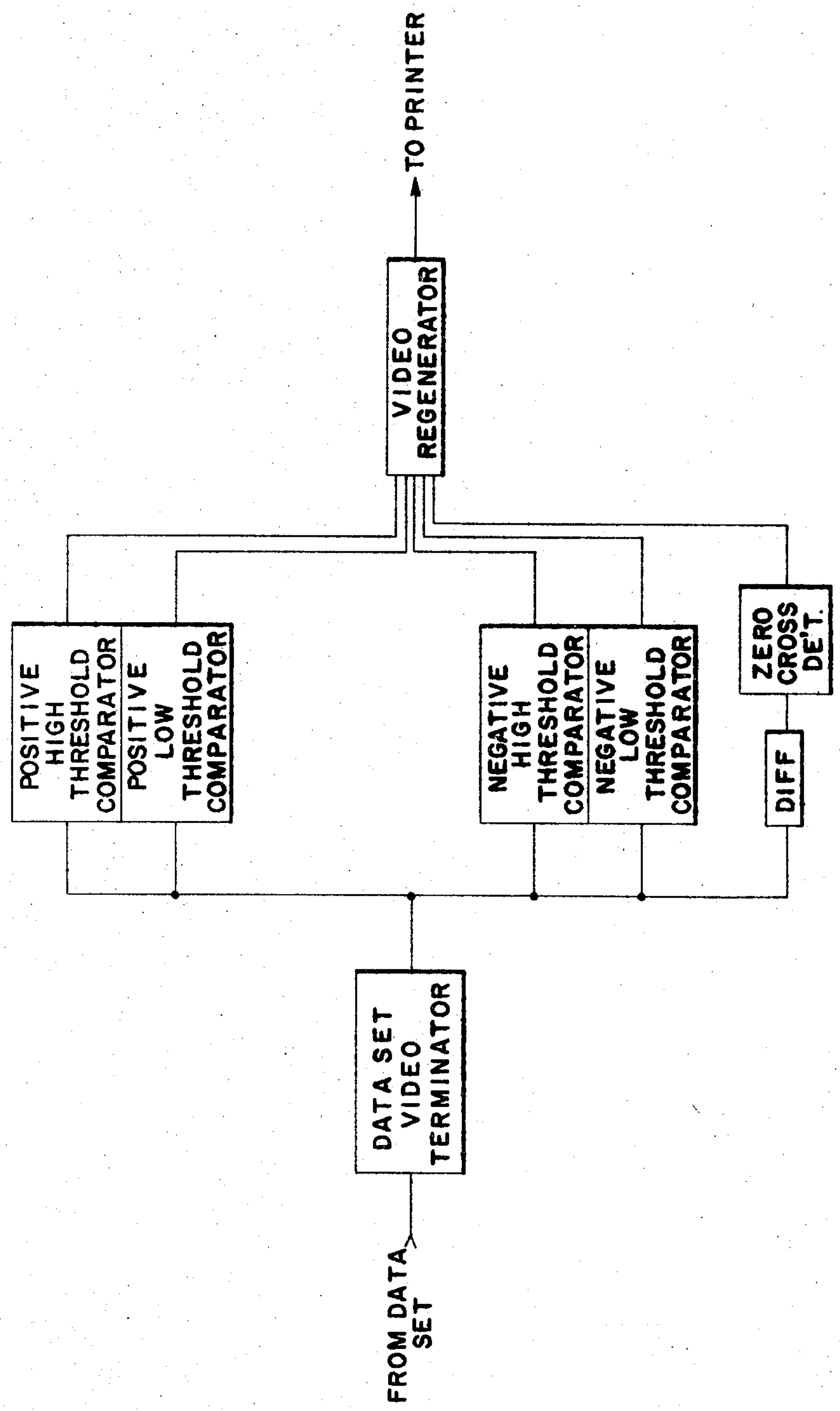
FIG. 15 is a logic diagram of the receiver portion of the quantized coding system.

After transmission, the bandlimited pulse train recovered by an associated data set is applied to a decoder. A block diagram of the decoder utilized in the present invention is shown in FIG. 15. The video terminator adapts the output of the associated data set to the circuits which follow. The four comparator circuits provide thresholds at +3B/4, +A/2, −A/2 and −3B/4 and their logical output indicates the presence of one of the five possible levels ±B, ±A, or zero. "Or" gates in the video regenerator interpret either polarity of a given magnitude as the same information. The differentiator and zero crossing detector produce a waveform which identifies the time of occurrence of the peaks of the received pulse train as zero crossings.

Figure 16:
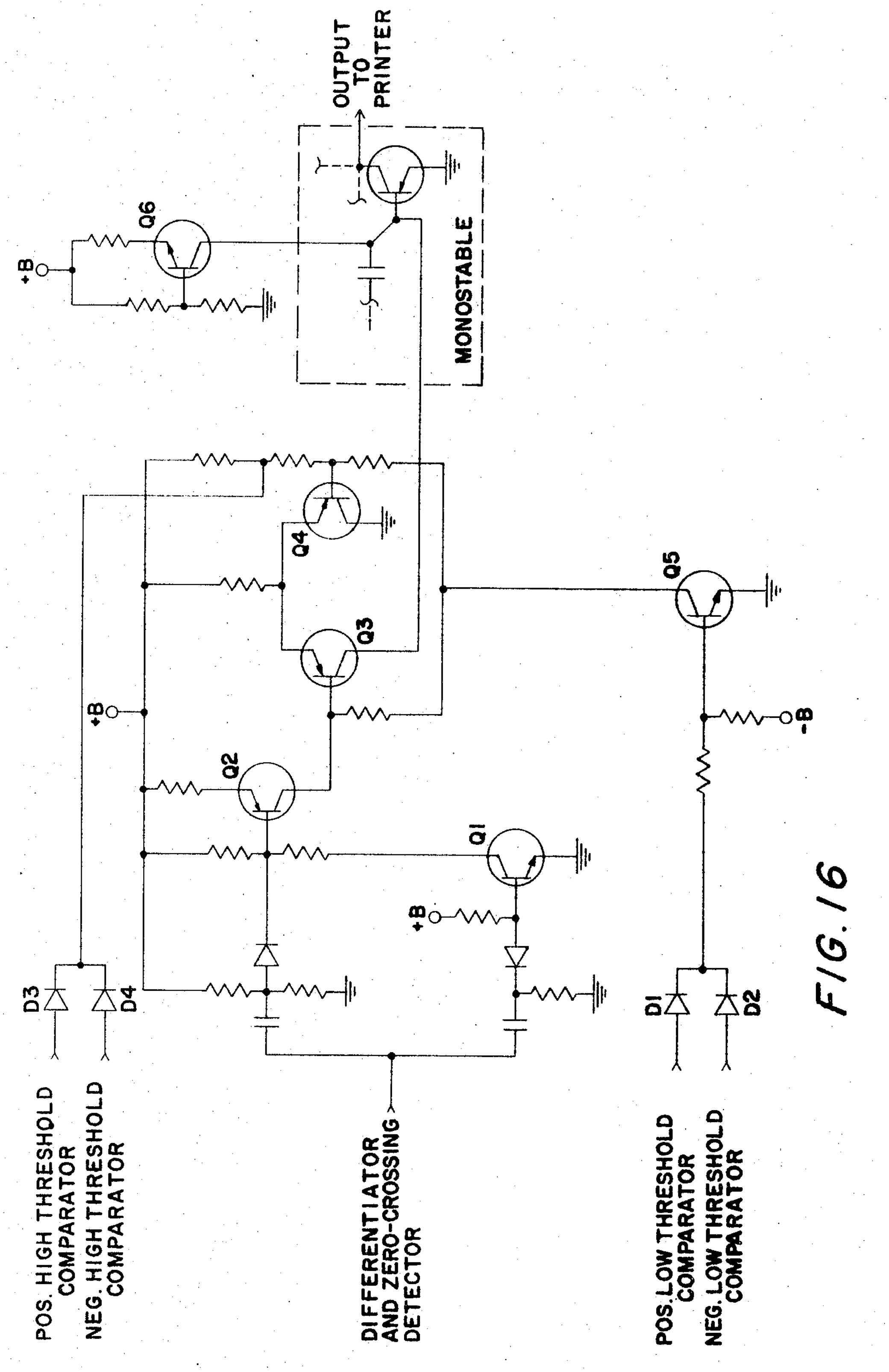
FIG. 16 is a schematic diagram of the video regenerator shown in FIG. 15.

A simplified version of the video regenerator used in the quantized decoder implementation of FIG. 15 is shown in FIG. 16. The input from the peak-time detector (differentiator and zero-crossing detector) is a square wave whose positive and negative going transitions coincide with the positive and negative peaks of the bandlimited semi-encoded waveform. $Q_1$ and $Q_2$ together with the diode-capacitor coupling to their bases perform "OR' gating of the input transitions. $Q_1$ and $Q_2$ are normally on. When a positive transition occurs the transient created by the AC coupling in the base of $Q_2$ shuts off $Q_2$ momentarily. When a negative transition occurs the transient created by the AC coupling in the base of $Q_1$ shuts off $Q_1$ momentarily and thereby shuts off $Q_2$ momentarily.

If either the positive or negative low level thresholds are exceeded by the signal, Q5 is turned on via the "oring" function of diodes D1 and D2. Otherwise Q5 is off. If either the positive or negative high level threshold is exceeded, the normal base bias on Q4 is changed to a more positive second value via the "or-ring" function of diodes D3 and D4. The collector of Q3 discharges the timing capacitor of the monostable circuit (shown in a partial schematic) from its normal negative charge to a first or second positive charge as dtermined by the base bias on Q4. O6 is a current source for the timing capacitor of the monostable circuit to provide a linear relationship between charge and charge time. The output side of the monostable is normally conducting and the output level is normally ground. The operation of the circuit is as follows. If a positive or negative peak of the received data occurs but the low threshold is not exceeded Q5 remains off keeping Q3 off. The momentary shutting off of Q2 due to the detected peak has no effect on the monostable and the output remains at ground. If either of the lower thresholds have been exceeded, but neither of the upper thresholds, Q5 is turned on and the first potential on the base of Q4 causes Q3 to discharge the monostable timing capacitor to a first positive level when Q2 is momentarily shut off by the detected peak. This causes the output of the monostable to go negative for a first time interval which is made to be equal to one picture element. If either of the upper thresholds are exceeded then Q5 is on, since a lower threshold is also exceeded, and the second potential on the base of Q4 causes Q3 to discharge the monostable timing circuit to a second positive level when Q2 is momentarily shut off by the detected peak. This causes the output of the monostable to go negative for a second time interval which is equal to two picture elements. The output is therefore a negative level whose leading edge is coincident with the peak of the received signal and whose duration is one or two picture elements depending on the amplitude of the received signal. It should be noted that the negative level utilized to represent black in the present circuit is compatible with certain printers utilized in the facsimile art. A long black run is produced by contiguous two element runs. Note that the timing capacitor can be discharged at any time during its charge cycle so if successive two-element signal peaks occur closer than normal due to transmission disturbance the black runs merely overlap slightly but still form a continuous run.

Implementation of Continuous Analog Coding System

Figure 17:
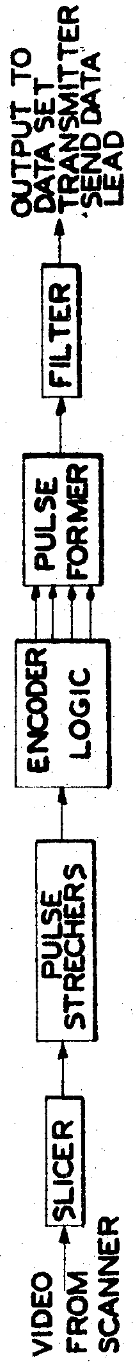
FIG. 17 is a block diagram of the transmit portion of the continuous analog coding system.
Figure 18:
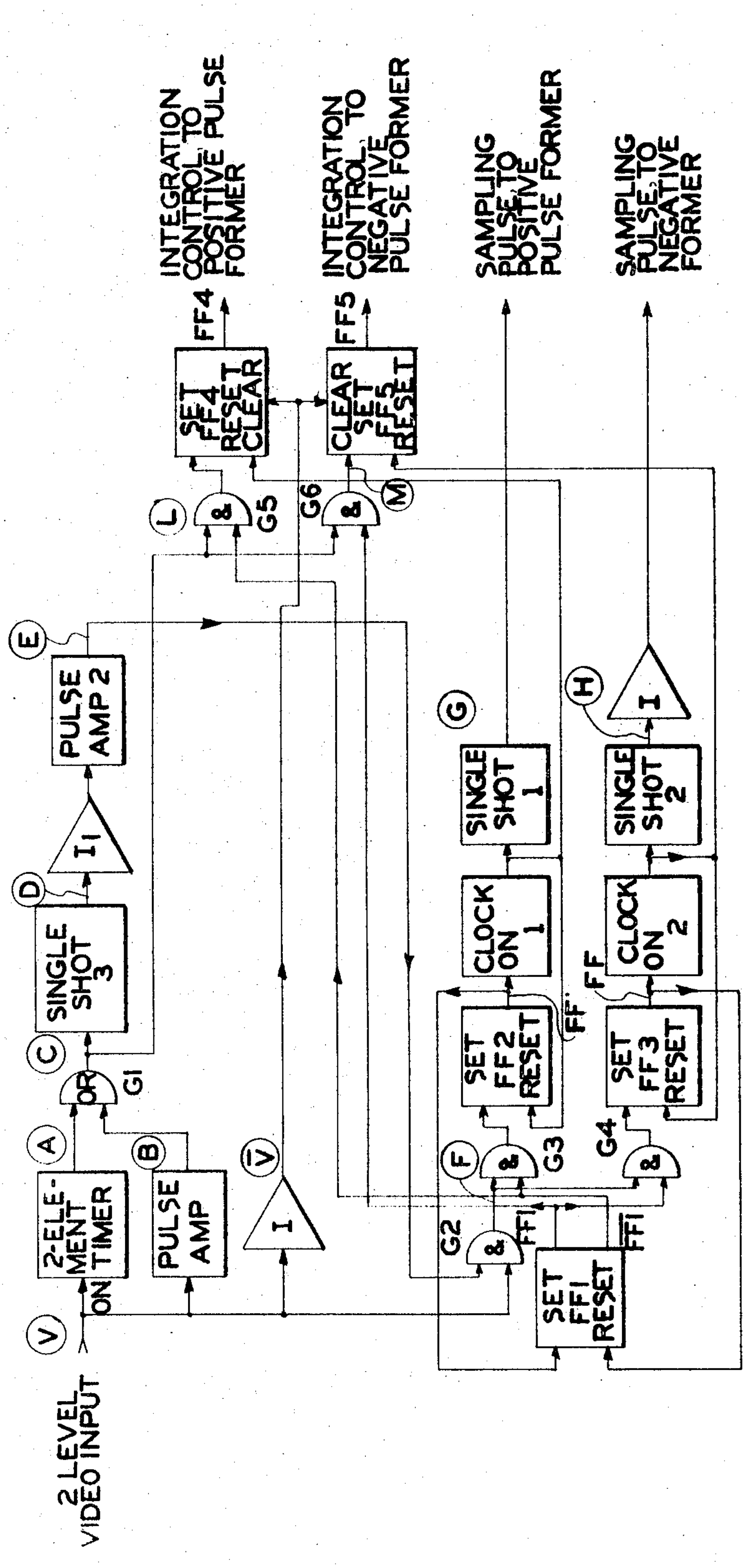
FIG. 18 is the logic diagram of the transmitter encoding circuitry utilized in the block diagram of FIG. 17.

FIG. 17 is a block diagram of the transmit end of the semi-encoding scheme with continuous analog encoding of black runs. The slicer, pulse stretchers, filter, are similar to the "quantized" model discussed hereinabove. FIG. 18 is a diagram of the logic portion of the encoder. In order to illustrate the operation of this embodiment, the following parameters will be utilized.

The nominal minimum pulse spacing is 532 microseconds. A detection threshold of one-fifth the maximum pulse amplitude is established and the "extended run" method of accommodating the threshold is used, resulting in a one-half element overlap. The maximum signal level thus represents a 2 ½ element black run. Pulse stretchers preceding the encoder are set to guarantee that any black level is at least 266 microseconds long (one element) and that any white level is at least 173 microseconds long (0.65 element). As a result leading edges as close as 440 microseconds (82.5 percent of nominal pulse spacing) are encoded and transmitted. This "graceful degradation" range is less than for the quantized system because the slope of the encoding transfer function is less (See FIG. 4*a*).

Figure 19A:
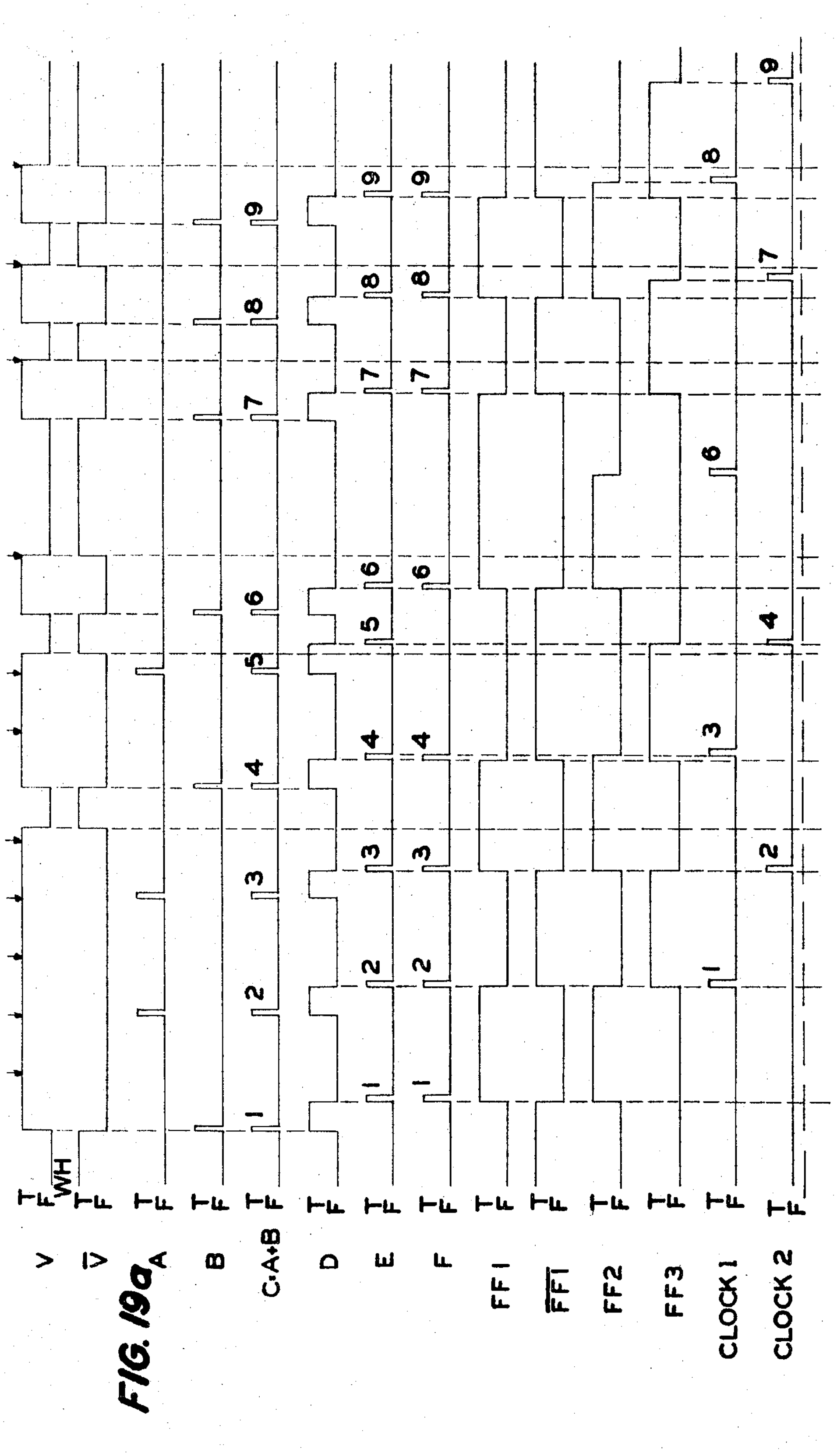
FIGS. 19A and 19B are waveforms associated with the logic circuitry of FIG. 18.
Figure 19B:
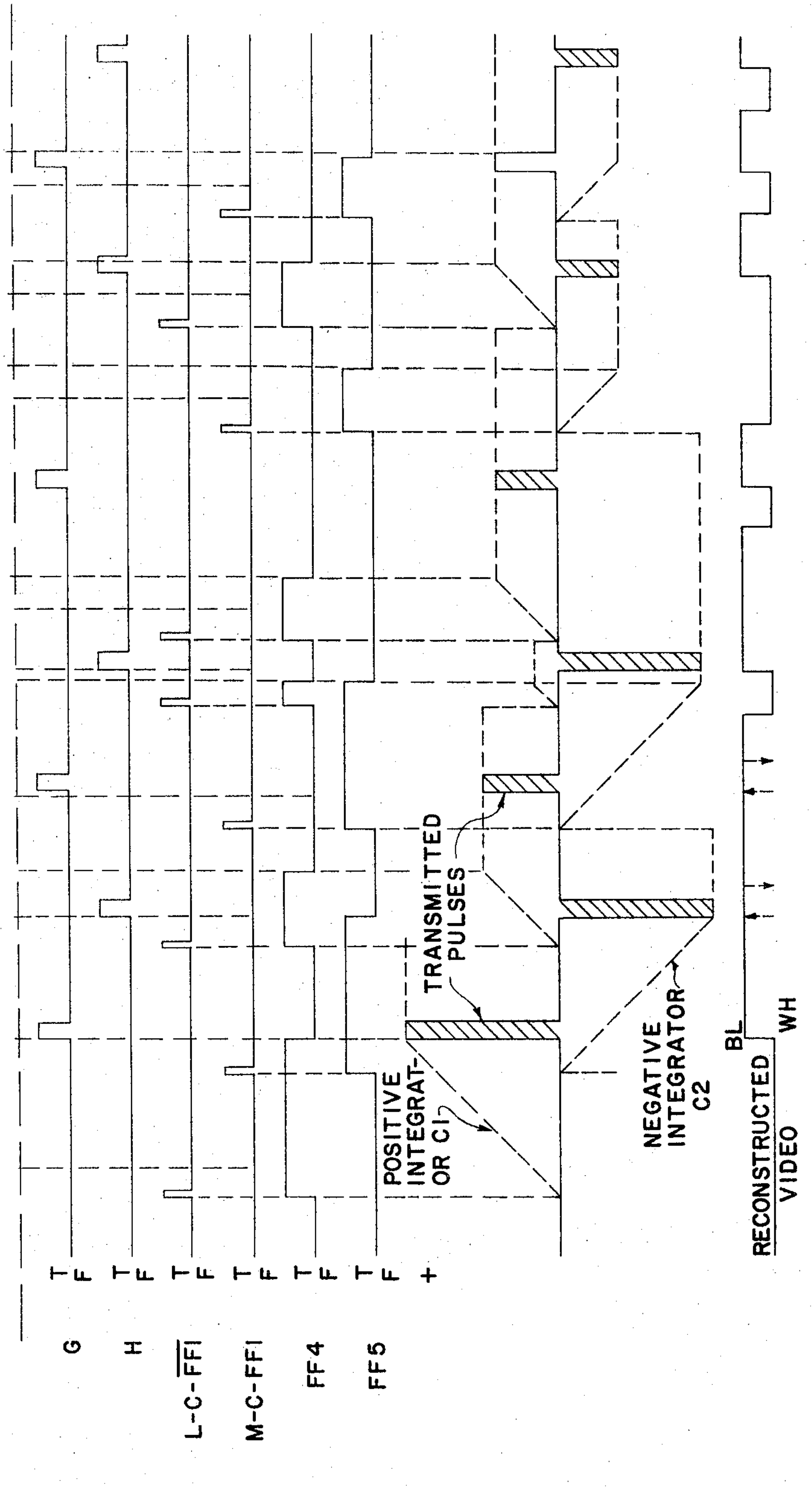

The associated waveforms for the logic diagram of FIG. 18 are shown in FIG. 19. For purposes of explanation it is assumed that the "up" level represents logical "true" and the "down" level represents logical "false." The video black level is "true." The flip-flops are triggered by rising edges and the gates function on the "true" levels according to their designations. The normal flip-flop output is designated "FF," the inverted output is designated "FF." The flip-flops are reset regardless of the other input conditions when a rising edge is applied to the "clear" input. The inverters, "I," change the "true" level to "false" and vice-versa. The single-shot functions are monostable circuits which create a "true" level at their outputs for a specified time after being triggered by a rising (false-to-true) edge. The clocks are the same circuits as used in the "quantized" implementation (FIG. 11). They deliver narrow "true" pulses at a constant rate (one-half the nominal element rate) when their "on" terminal goes true. The pulses always start in a prescribed phase relationship to the "on" signal. In this application, only one clock pulse at a time is emitted, as described below. The 2-element timer is the same circuit as the clocks. Its phase is adjusted so that the first output pulse occurs exactly two element-times after the "on" control goes "true". The pulses continue with this spacing, i.e. the frequency is one-half the nominal element rate. The pulse amplifiers create a narrow triggering pulse from each rising edge. It is to be understood that in an actual implementation "true" and "false" can be any convenient levels, and "true" need not be more positive than "false." Also the circuits may have different triggering characteristics. An actual implementation may therefore appear superficially different in the application of gates, inverters, etc. The logic operates as follows.

The white-to-black video transition turns on the 2-element timer which creates narrow pulses every two elements thereafter as long as the video is black. The video transition itself also creates a narrow pulse via the pulse amplifier. The outputs of the 2-element timer and pulse amplifier are coupled to OR gate G1 to form a pulse train with a pulse which marks each white-to-black transition of the video, and pulses which mark the beginning of each subsequent 2-element run of a continuing black run (waveform C, FIG. 19). Single-shot 3 is set to produce an output pulse exactly one-half picture element in duration (wave-form D). The output of single shot 3 is coupled to one input of gate G2 via inverter I, and pulse amplifier 2. The output of pulse amplifier 2, waveform E, is a delyaed version of waveform C. The pulses of E which mark the beginning of the end of a black run are eliminated, if the end of the run is less than one-half element, by "and-ing" E with the video in G2, resulting in waveform F. By this technique, pulses which represent less than one-half element are prevented from being encoded and transmitted. (Black runs shorter than one element cannot occur alone because of the pulse stretchers which precede the encoding logic). Waveform F sets FF2 or FF3, depending on the state of FF1, and is steered by "and" gates G3 and G4. If FF1 is reset ($\overline{FF1}$ "true"), then FF2 is set, clock 1 is turned on and FF1 is set by the FF2 output. The next pulse will then set FF3, turn on clock 2 and FF1 is reset by the FF3 output. Thus the selection alternates and the initial choice is immaterial. In the present illustration, it is assumed that clock 1 is turned on. The clock phase and frequency are adjusted so that an output pulse occurs 2 elements after turn on. The clock pulse resets FF2 and the clock thus turns itself off after its first pulse occurs. The next pulse of waveform F causes the same events with clock 2. The two clocks thus alternate outputs as shown in FIG. 19. The clocks perform the same as the two element timer except that they never put out more than one pulse in succession. Note that the first clock pulse occurs 2 ½ elements after the beginning of a black run of video and clock pulses occur at 2 element intervals thereafter.

Waveform C sets FF4 or FF5 depending on the state of FF1 as steered by "and" gates G5 and G6. Waveforms L and M appear at the output of gates G5 and G6 respectively. The gating is arranged so that when FF4 is set, clock 1 will be energized, and when FF5 is set clock 2 will be energized. FF4 is reset when the clock pulse from clock 1 occurs, and likewise FF5 is reset when the clock pulse from clock 2 occurs. FF4 and FF5 are both reset if a black run ends prior to the occurrence of a clock pulse. This is accomplished by applying inverted video, $\overline{V}$, to the "clear" inputs of FF4 and FF5. Note that FF4 (or FF5) is turned on at the beginning of a black run, or the subsequent 2-element extensions of the run, and remains on until the end of the black run or for 2 one-half elements, whichever occurs first. Also note that the "on" periods of FF4 and FF5 overlap by one-half element if the black run is extended. The states of FF4 and FF5 are used to control the integration times of the pulse-former. The one-half element overlap and elimination of pulses representing less than one-half element (described above) combine to provide the "extended-run" method of thresholding. The clock pulses may be converted to wider sampling pulses by single-shots 1 and 2 (waveforms G and H, respectively) and one sample pulse is inverted to accommodate the needs of the particular pulse forming circuitry. These pulses sample the voltage of the integrator in the pulse former and thereby produce pulses for transmission whose magnitude is proportional to the duration of black run. Operation of the pulse-former is as follows.

Figure 20:
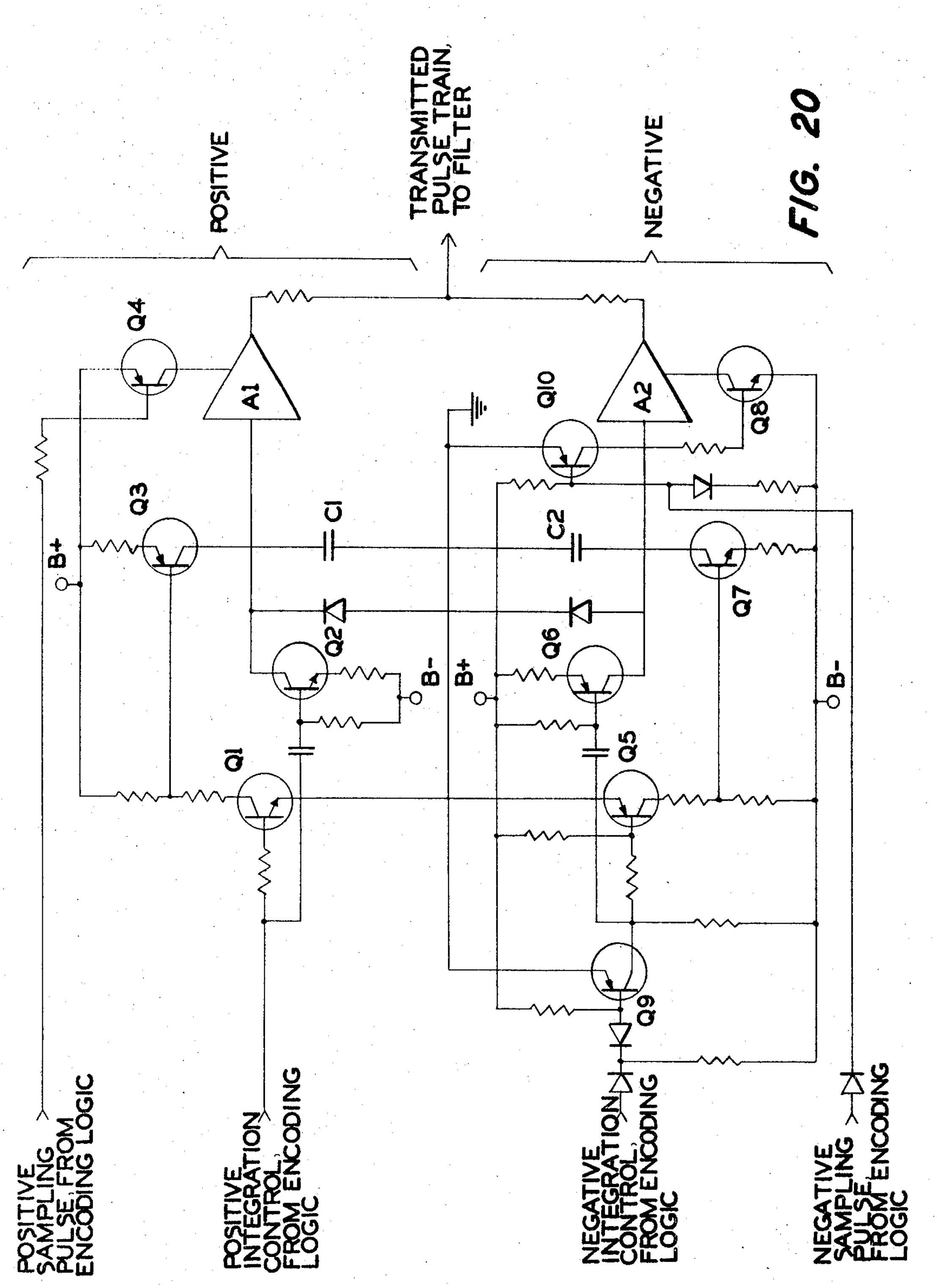
FIG. 20 is a schematic of the pulse former shown in FIG. 17.

The pulse former is shown in FIG. 20 in simplified form. It consists of two integrators and two samplers. One integrator integrates in the positive direction and one integrates in the negative direction. Since the integration controls (FF4 and FF5) alternate, the output polarity alternates.

The integration control derived from FF4 of FIG. 18 is applied to Q1. When this input is zero (false) Q1 is nonconducting and Q3 is thereby non-conducting. Q2 is also nonconducting. When the input goes true (positive) Q2 is turned on momentarily by the transient created by the capacitor coupling to its base. Q2 conducts heavily for this short time discharging C1 toward the negative supply voltage. The diode across C1 assures that the discharge halts when the voltage across C1 is zero. The positive input level causes Q1 to conduct thereby biasing Q3 into conduction. Q3 is a current source for C1 which therefore charges linearly in a positive direction. (See FIG. 18). This integration continues as long as the input is positive. Since the input directly follows black runs (up to 2 ½ elements in length) the voltage on C1 is a direct measure of the black run length (up to 2 ½ elements). When the run ends, either naturally or because the limit is reached, Q1 is cutoff and Q3 stops charging. A high impedance amplifier circuit A which does not load C1 is coupled thereacross so the voltage created by charging will remain constant when the charging ceases. The sample pulse occurs 2 ½ element times after charging began. The positive sampling pulse is zero when false and positive when true. When this input is zero, Q4 is conducting and the output of A1 is forced to zero. When the sampling pulse goes positive Q4 is cutoff and the output of A1 follows it's input, the voltage on C1. A transmitted pulse is thus created which has the time duration of the sample-pulse, positive polarity, and magnitude proportional to the duration of the black run which started 2 ½ elements earlier.

The charge remains on C1 until the next positive integration interval occurs. Then it is dumped via Q2 at the beginning of the interval as described above.

The negative portion of the circuit operates in a similar way. Q7 is the current source for C2 which is charged in the negative direction. Q5 is the switch control for Q7. Q6 discharges C2 towards the positive supply, and the diode across C2 clamps it to ground. A high input impedance amplifier circuit A2 reads the voltage on C2 under the control of Q8. However, because of the polarity inversion transistors Q9 and Q10 and extra diodes are required to effect proper control from the available input. The negative integration control ($\overline{FF5}$) is negative when false and zero when true. The negative level keeps Q9 conducting, Q5 nonconducting, and Q7 non-conducting. The zero level biases Q9 non-conducting, Q5 conducting and Q7 conducting, thereby charging C2. Q6 is turned on by the negative transition at the collector of Q9. The negative sampling pulse is negative when false and zero when true. Q10 conducts when this input is negative, causing Q8 to conduct and forces the output of A2 to zero. When the sample-pulse input goes to zero Q10 is biased off, Q8 becomes non-conducting and the output of A2 follows the negative voltage on C2. A transmitted pulse is thus created which has the time duration of the sample-pulse, negative polarity, and magnitude proportional to the duration of the black run which started 2 one-half elements earlier.

Since the logic of the encoder has been arranged to alternate the integration controls and sample-pulses, the output of the pulse former is a train of pulses which alternates in polarity. The pulse magnitudes range from one-half element to 2 ½ elements according to the encoding limit of 2-elements per pulse, plus the "extended run" thresholding scheme. The integration periods overlap when a run exceeds two elements and likewise the reconstructed video overlaps. However, the result is a faithful reproduction of the input video. It can be seen from FIG. 19 that a pulse is transmitted 2 ½ elements after the beginning of each black run and every two elements thereafter if the run continues. The nominal minimum spacing between the transmitted pulses is two picture elements. However, the use of a dual system with overlapping encoding periods allows creation of pulses with closer than two element spacing. This provides the feature of graceful degradation described hereinabove. The last three pulses in FIG. 19 are spaced by less than 2 elements. Note that in this particular embodiment when an artificial transition representing less than one-half occurs at the end of a black run (see pulse pulse 5, FIG. 19) an integration control is created and integration takes place. However, no sampling pulse is generated so no pulse is transmitted. The integrator is merely discharged at the beginning of the next valid encoding interval.

Figure 21:
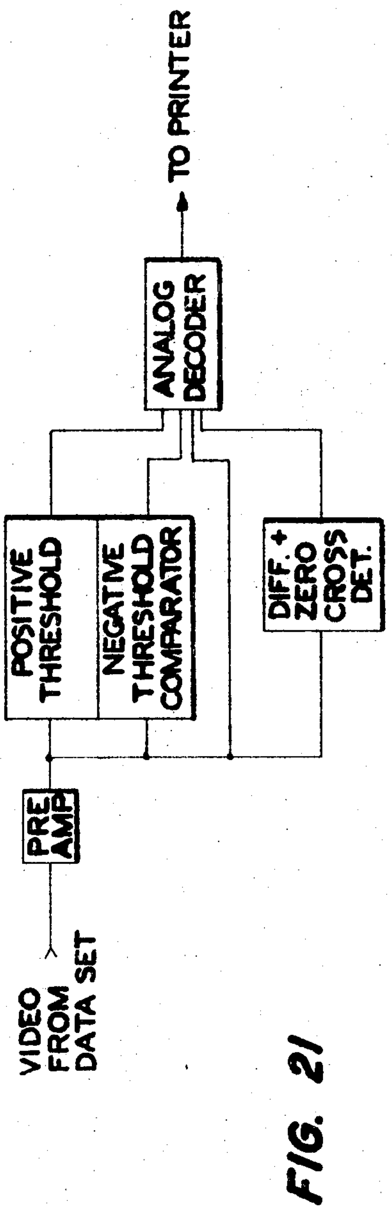
FIG. 21 is a schematic of the receiver portion of the continuous analog coding system.
Figure 22:
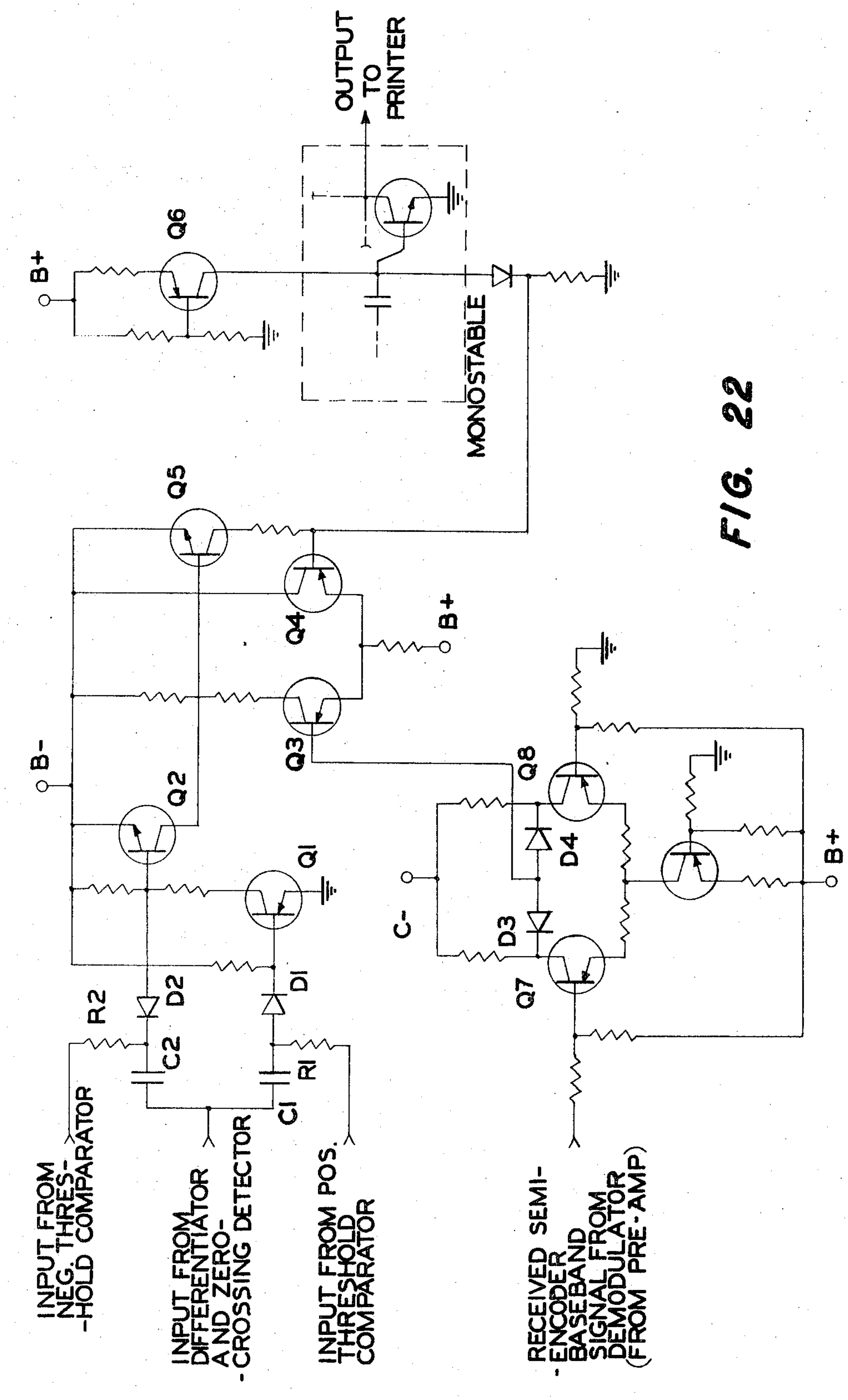
FIG. 22 is a circuit schematic of the analog decoder utilized in the receiver of FIG. 21.

A block diagram of the "continuous" semi-encoded receiver is shown in FIG. 21. The pre-amp is similar to the video terminator in the quantized model (FIG. 15). The positive-detector and negative detector are similar to the comparators used in the quantized model except that the output circuits are modified and only two are used. They are set to establish positive and negative thresholds at the minimum acceptable receive pulse magnitude. The differentiator and zero crossing detector are similar to the one utilized in the quantized model and perform the same functions. A simplified schematic diagram for the analog decoder is shown in FIG. 22. This circuit performs a function similar to that of the video regenerator used in the quantized version except that the output is continuously variable in time duration rather than quantized into two discrete durations. The output level for black may be positive or negative depending upon the printer used with the circuit illustrated. In the circuit illustrated, a positive level for black is required.

The input from the peak-time detector (differentiator and zero-crossing detector) is a square wave whose positive and negative going transitions coincide with the positive and negative peaks of the bandlimited semi-encoded waveform. $Q_1$ and $Q_2$ together with the diode-capacitor coupling to their bases perform OR gating of the input transitions. In addition, the gate resistors R1 and R2 are returned to the outputs of the threshold detectors so that the transitions are logically AND gated with these outputs. The function of the threshold detectors in this embodiment is to eliminate received signals of less than a prescribed minimum amplitude, for example, one-fifth of the maximum. The "true" and "false" output levels for the positive threshold comparator are O V and −12 V respectively. The negative threshold comparator is reversed i.e., true and false are −12 V and 0 V respectively. If a negative transition occurs, marking a negative peak, it cannot reach the base of $Q_2$ unless the negative threshold is also true, −12 V. Likewise if a positive transition occurs marking a positive peak, it cannot reach the base of $Q_1$ unless the positive threshold is also true. The gating of the differentiator zero-crossings by the threshold outputs eliminates the spurious zero-crossings not associated with a legitimate signal peak.

$Q_1$ and $Q_2$ are normally on. When a positive transition occurs and the positive threshold is true, the transient created by the AC coupling shuts off $Q_1$ momentarily and thereby shuts off $Q_2$ momentarily. $Q_7$ and $Q_8$ form a differential amplifier whose reference is ground. Input signals of either polarity are amplified and appear in opposite phase on the collectors. Diodes D3 and D4 perform negative full wave rectification so that regardless of the polarity of the input to the differential amplifier the base of $Q_3$ goes proportionately negative and $Q_3$ conducts proportionately. When $Q_2$ is on, $Q_5$ is off. In the quiescent state the timing capacitor of the monostable, the monostable being shown in a partial schematic, is charged positively, the output stage of the monostable is conducting, and the output level is ground. When $Q_2$ goes off momentarily, due to a differentiator zero-crossing, $Q_5$ conducts and discharges the timing capacitor negatively. The discharge continues until the base voltage on $Q_4$ matches the base voltage on $Q_3$. As the conduction of $Q_4$ increases, the conduction of $Q_3$ decreases and this causes the conduction of $Q_5$ to decrease. The three transistors reach a state of equilibrium in which the voltage on the timing capacitor is maintained equal to the voltage at the base of $Q_3$, which is proportional to the input signal magnitude. This equilibrium is achieved during the momentary off period of $Q_2$. When the timing capacitor is thus discharged negatively, the output stage of the monostable goes off and the output level goes positive. When $Q_2$ goes back on after the zero-crossing transient disappears $Q_5$ goes off and the timing capacitor is charged linearly in a positive direction from the current source $Q_6$. When the monostable triggering level is reached the output stage goes on again and the output level goes back to ground. The discharge level and charging time are adjusted so that the minimum input signal level, i.e. one-fifth of maximum, produces a positive output signal for say one-half element, and the maximum input signal produces a positive output signal for 2 ½ elements. This circuit thus produces a positive output level whose leading edge corresponds to the peak of the received signal and whose duration is directly proportional to the magnitude of the peak of the received signal. Note that the timing capacitor can be discharged at any point in its charging cycle so that signal peaks closer than the discharge time will cause a continuous output as is desirable in the case of long black runs.

Transistor $Q_2$ may be replaced with a monostable to more accurately control the brief discharging interval.

The invention described hereinabove provides a simple, reliable and economical technique for increasing the speed of facsimile transmission over a bandlimited channel wherein synchronous sampling of the object to be transmitted is not required.

What is claimed is:

1. Apparatus for encoding a two-level non-synchronous video signal to achieve a reduced transmission time, without sacrificing resolution, given a limited bandwidth channel for said video signal, said apparatus comprising:

a. pulse generating means for supplying a train of pulses, each of said pulses corresponding to a transition of said video signal from a first level to a second level, each pulse in said puise train occurring at a predetermined point in time relative to a corresponding one of said transitions; and

*b.* means for adjusting the amplitude of each of said pulses to be dependent on the interval of time separating the transition corresponding to said each of said pulses from the next succeeding transition of said video signal from said second level back to said first level.

2. The apparatus as defined in claim 1 wherein said pulse amplitude is a continuous functon of said interval of time, and further including means for alternating the polarity of the pulses in said pulse train prior to transmission.

3. The apparatus as defined in claim 1 wherein said pulse amplitude is a discrete function of said interval of time, and further including means for alternating the polarity of the pulses in said pulse train prior to transmission.

4. The apparatus as defined in claim 1 further including a receiver coupled to said bandwidth limited channel for receiving said encoded pulse train, said receiver including means for reconstructing said two-level video signal; said receiver comprising;

*a.* first means coupled to said channel for recovering said pulse train, and

*b.* second means coupled to said first means for generating video pulses in timed synchronism with successive pulses of said pulse train, each of said video pulses having a duration proportional to the amplitude of corresponding pulses of said pulse train.

5. Apparatus for encoding two-level video signals for transmission over a channel of limited bandwidth comprising:

a. means for generating an electrical pulse train corresponding to the transitions between said two-level video signals, each pulse in said pulse train occurring at a predetermined point in time relative to a transition from a first video level to a second video level, b. means for adjusting the amplitude of each electrical pulse to be proportional to the time duration between the transition from said first video level to said second video level and a subsequent transition from said second video level to said first video level, the time between successive transitions from said first to said second video levels corresponding to an encoding period, c. means for generating an additional pulse when the time duration between the transition from a first video level to a second video level and a subsequent transition from said second video level to said first video level is greater that a predetermined time value, said additional pulse corresponding to the difference between said time duration and said predetermined time value, the sum of the amplitudes of the transition pulse and said additional pulse corresponding to said time duration, and d. alternate clocking means for encoding successive transitions from said first to said second video levels whereby successive encoding periods overlap by a predetermined amount.

6. A method of encoding a two-level, non-synchronous video signal to achieve a reduced transmission time, without sacrificing resolution, given a limited bandwidth transmission channel for said video signal; said method comprising the steps of:

a. generating a train of pulses, each of said pulses corresponding to a transition of said video signal from a first level to a second level, each of said pulses occurring at a predetermined point in time with respect to a corresponding one of said transition; and b. adjusting each of said pulses to have an amplitude dependent on the interval of time separating the transition corresponding to said each of said pulses from the next succeeding transition of said video signal from said second level back to said first level.

7. The method of claim 6 further including the step of adjusting the pulse amplitude to be proportional to the interval of time separating the transition corresponding to such pulse from said next succeeding transition, whenever said interval does not exceed a predetermined time period.

8. The method of claim 7 further including the steps of limiting the pulse amplitude to a predetermined level whenever the interval of time separating the transition corresponding to such pulse from said next succeeding transition exceeds said predetermined period, said predetermined level being proportional to said period; and inserting at least one additional pulse into said pulse train immediately after any such amplitude limited pulses, said at least one additional pulse having a net amplitude proportional to the difference between said interval and said period, whereby the sum of the amplitudes of said amplitude limited pulse and said at least one additional pulse is proportional to said interval.

9. The method of claim 8 wherein said at least one additional pulse includes a plurality of discrete pulses whenever said difference exceeds said period, said discrete pulses having net amplitudes proportional to said difference without any of said discrete pulses having an amplitude exceeding said predetermined level.

10. The method of claim 9 wherein said pulses are all of substantially uniform duration.

11. The apparatus of claim 1 further including means for adjusting the amplitude of each of said pulses to be proportional to the interval separating the transition corresponding to said each of said pulses from said next succeeding transition, unless said interval exceeds a predetermined period, in which event the pulse amplitude is limited to a predetermined level proportional to said period; and said pulse generating means further including means for inserting at least one additional pulse onto said pulse train after any such amplitude limited pulse, said at least one additional pulse having a net amplitude proportional to the difference between said interval and said period, whereby the sum of the amplitudes of said amplitude limited pulse and said at least one additional pulse is proportional to said interval.

12. The apparatus of claim 11 wherein said inserting means includes means providing a plurality of discrete pulses whenever said difference exceeds said period, none of said discrete pulses having an amplitude exceeding said predetermined level, but the sum of the amplitudes of said discrete pulses being proportional to said difference.

13. The method of claim 10 wherein said pulse amplitude is a continuous function of said time interval, and further including the step of alternating the polarity of the pulses in said pulse train prior to transmission.

14. The method of claim 10 wherein said pulse amplitude is a discrete function of said time interval, and further including the step of alternating the polarity of the pulses in said pulse train prior to transmission.

* * * * *